(12) United States Patent
Sato

(10) Patent No.: US 7,724,741 B2
(45) Date of Patent: May 25, 2010

(54) IMAGE FORMING APPARATUS CONNECTED TO NETWORK

(75) Inventor: Eiichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1103 days.

(21) Appl. No.: 10/438,807

(22) Filed: May 16, 2003

(65) Prior Publication Data

US 2003/0223363 A1 Dec. 4, 2003

(30) Foreign Application Priority Data

May 28, 2002 (JP) ............................... 2002-154208

(51) Int. Cl.
*H04L 12/28* (2006.01)
*H04N 1/40* (2006.01)
*G06F 3/12* (2006.01)
*G06F 15/16* (2006.01)

(52) U.S. Cl. ..................... 370/392; 358/3.23; 358/1.15; 709/203

(58) Field of Classification Search ................. 370/230, 370/229, 235, 389, 392, 471; 358/1.1, 1.2
See application file for complete search history.

(56) References Cited

U.S. PATENT DOCUMENTS

| 6,163,383 | A | * | 12/2000 | Ota et al. ..................... 358/1.1 |
| 6,166,826 | A | * | 12/2000 | Yokoyama ................. 358/1.16 |
| 6,369,909 | B1 | * | 4/2002 | Shima ........................ 358/1.15 |
| 6,731,395 | B1 | * | 5/2004 | Shiohara ..................... 358/1.15 |
| 2001/0050782 | A1 | * | 12/2001 | Niitsuma et al. ........... 358/1.15 |
| 2002/0042881 | A1 | * | 4/2002 | Okigami ..................... 713/200 |
| 2002/0114004 | A1 | * | 8/2002 | Ferlitsch .................... 358/1.15 |

FOREIGN PATENT DOCUMENTS

| JP | 09-288552 | 11/1997 |
| JP | 2002-010012 | 1/2002 |
| JP | 2002-063008 | 2/2002 |

* cited by examiner

*Primary Examiner*—Seema S Rao
*Assistant Examiner*—Christine Duong
(74) *Attorney, Agent, or Firm*—Fitzpatrick, Cella, Harper & Scinto

(57) ABSTRACT

When a command packet for an image forming apparatus is received, the image forming apparatus extracts information for specifying a source from the received packet, specifies the user who sends the command from the information, and decides the presence of the right to execute the command. When the user has the right, the command is received. When the user does not have the right, the command is not received. Thereby, an unintentional access from an outsider is rejected so that confidential information can be prevented from leaking.

2 Claims, 25 Drawing Sheets

| IP ADDRESS | LPR | CONFIGURATION CHANGE | REPRINT |
|---|---|---|---|
| 222.111.10.194 | 1 | 0 | 0 |
| 222.111.10.202 | 1 | 0 | 1 |
| 222.111.10.231 | 1 | 1 | 1 | ssistant

IMAGE FORMING APPARATUS CONNECTED TO NETWORK

BACKGROUND OF THE INVENTION

1. Field of the Invention

The present invention relates to a technique for adapting an image forming apparatus provided on a network to an environment commonly used by users having various authorities.

2. Description of the Related Art

Conventionally, a device access to an image forming apparatus such as a printer has been performed by various utility programs executed on a client. Therefore, the client capable of executing the utility program can easily execute the function of the utility with respect to the image forming apparatus by executing the utility program.

More specifically, for example, all the clients for which a queue manager of print job is set executable execute the queue manager program so that the status display or control of the print queue of the image forming apparatus can be performed.

However, since various users may be present on the network, when the control for the image forming apparatus is performed from all the clients for which the utility program is installed, the normal operation of the image forming apparatus may be remarkably threatened. For example, when a user who does not have any knowledge on the network executes the device manager program from the client for which the device manager is installed so as the change the network configuration, the image forming apparatus cannot operate normally so that the normal operation may be stopped.

Further, in recent years, a mobile environment has been enhanced, in some cases the network in a company is temporarily provided to a user outside the company and a print for the image forming apparatus is performed. At this time, if the queue manager is installed in the mobile client of the user, the user outside the company can print or delete the print job remaining in the print queue of the image forming apparatus. This is remarkably dangerous from the viewpoint of confidentiality of business information.

SUMMARY OF THE INVENTION

It is an object of the present invention to ensure security by disabling an invalid user to control an image forming apparatus even when a utility program is installed in a client.

Further, it is another object of the present invention to normally operate an image forming apparatus by disabling an invalid user to control the image forming apparatus even when a utility program is installed in a client.

Further, it is another object of the present invention to enable the image forming apparatus to decide the security level of the client and to determine whether or not to execute a received command.

Furthermore, the other objects of the present invention will be apparent from the following specification and drawings.

DESCRIPTION OF THE PREFERRED EMBODIMENTS

Hereinafter, embodiment according to the present invention will be described.

First Embodiment (Network Connection Form)

Figure 10:
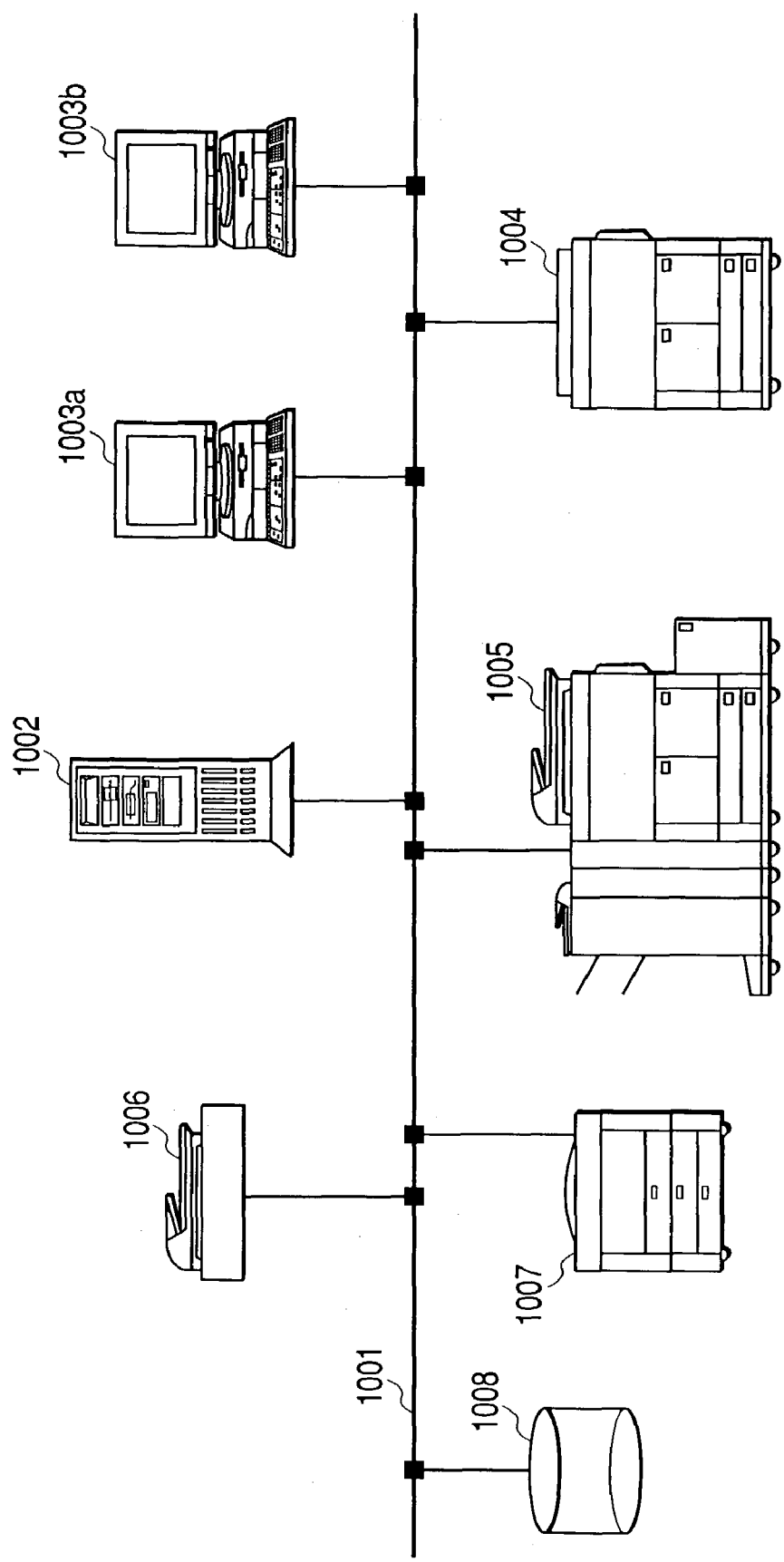
FIG. 10 is a diagram showing a network connection form.

FIG. 10 shows a network connection form between an image forming apparatus and clients according to the present embodiment.

In the drawing, reference numeral 1001 denotes a network such as LAN, reference numeral 1002 denotes a server computer, and reference numeral 1003 denotes a client computer (actually, several computers are connected on the same network).

On one hand, versatile network devices 1004 and 1005 called MFP (Multi Function Peripheral) are connected to the network 1001 so that functions such as a network scan, a network print, and the like are provided. Reference numeral 1004 denotes a MFP to which an option device is not connected, and reference numeral 1005 denotes a MFP to which various option devices are connected.

On the other hand, a network device which operates with a single function is connected to the network 1001, where a scanner 1006, a printer 1007, and the like are present, but they are almost equivalent to the above MFP from the viewpoint of the operation so that these devices are also denoted MFP hereinafter.

Reference numeral 1008 denotes a memory device for data storage connected to the network, which can temporarily save/store various data sent via the network 1001.

Furthermore, though not shown on this network 1001, other device such as a scanner, a printer, or a FAX is connected to this network 1001 in addition to the clients, various servers, and the above MFP.

Here, a so-called DTP (Desk Top Publishing) application software is operated on the client computer 1003 so that various documents/graphics are created/edited. The client computer 1003 converts a created document/graphic into the PDL (Page Description Language), which is sent and output via the network 1001 to the MFP 1004, 1005, or the printer 1007 through an instruction by an activation software called a printer driver from the client computer 1003.

An original placed on the scanner 1007 or the MFP 1004, 1005 can be sent as image data to the network 1001 to be saved on the memory device 1008, or to be displayed on a display of the computer 1002 (or 1003), or to be sent and output to the MFP 1004, 1005, or the printer 1007 through an instruction by the activation software called a scanner driver form the client computer 1003.

Next, the MFP 1004, 1005 have communication means capable of exchanging information via the server computer 1002 or the client computer 1003 and the network 1001, respectively, so that the configuration information or the device status of the MFP 1004, 1005 can be read and written from the valid server computer 1002 or client computer 1003. The server computer 1002 or the client computer 1003 has a utility software operating in response to the information so that the device such as the MFP connected to the network is collectively managed under this server computer 1002 or the client computer 1003.

(Execution of Print)

Figure 26:
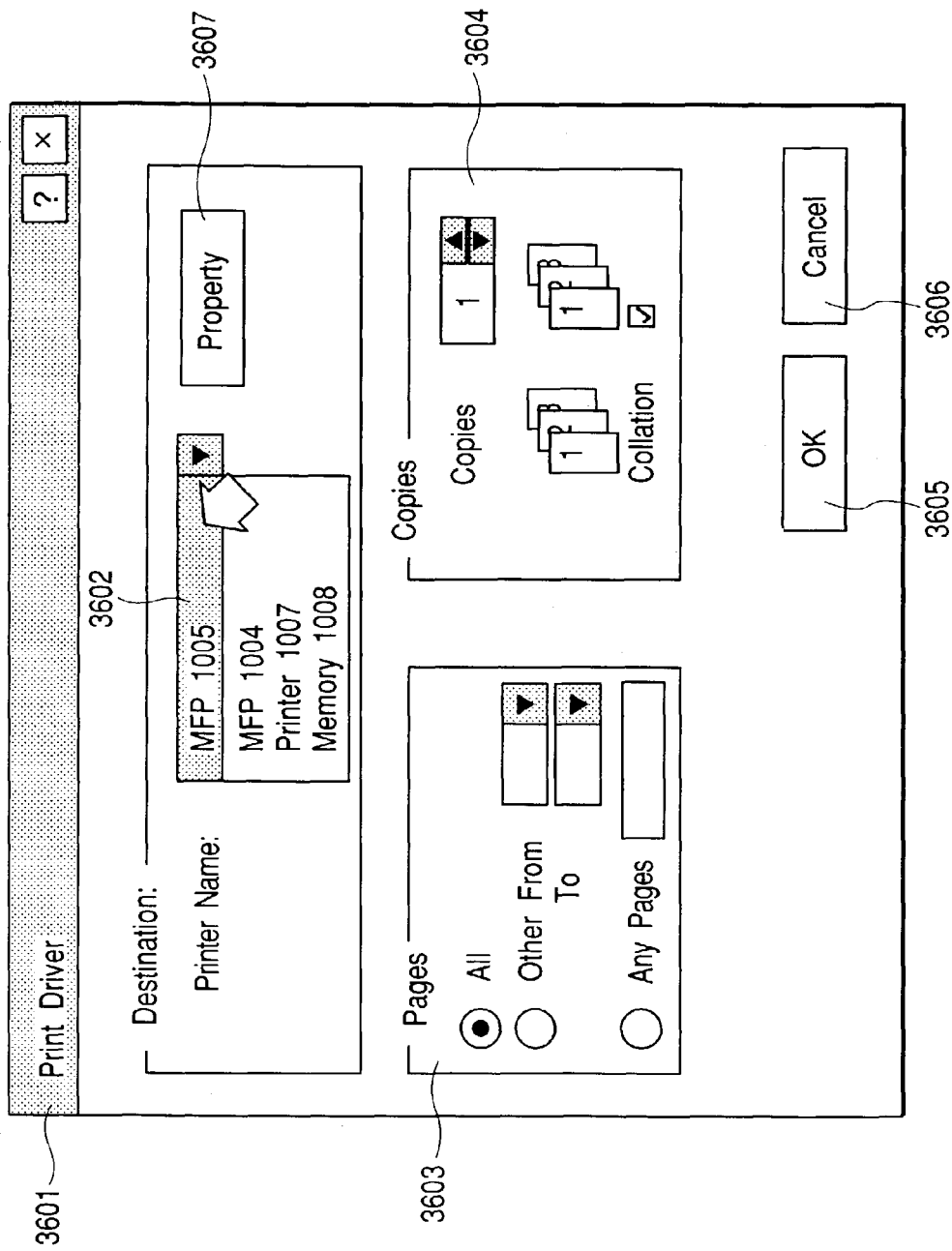
FIG. 26 is a diagram showing a user interface of a printer driver.

The execution of print is realized by executing a utility program called a printer driver on the client computer 1003. FIG. 26 shows a user interface screen of the printer driver.

There will be described a process of sending image data by the printer driver from the client computer 1003 to the printer using the drawing. The printer driver is a GUI for instructing a print operation, and the user may instructs a desired setting parameter by instructing through the GUI and can send the desired image to a destination such as the printer.

Here, reference numeral 3601 denotes a window of the printer driver, and reference numeral 3602 is a destination selection column for selecting a target output destination as a setting item thereof. The column is generally like the MFP 1005 or the printer 1007, but the image may be sent to the memory 1008 for saving. Reference numeral 3603 denotes a page setting column for selecting an output page from the job, which decides which page in the image created by the application software operating on the client computer 1003 to output. Reference numeral 3604 denotes a copy number setting column for designating the number of copies. Reference numeral 3607 denotes a property key for performing detailed setting with respect to the destination device selected in the destination selection column 3602. When this key is clicked, the configuration information specific to the device is input on another screen to change the parameter of specific image process, for example the gamma conversion of output process or the spatial filter so that finer color reproduction or sharpness adjustment can be performed.

When a desired setting is completed, the print is started by an OK key 3605. If desired, the print can be cancelled by a cancel key 3606.

(Display and Control of Print Job)

Figure 22:
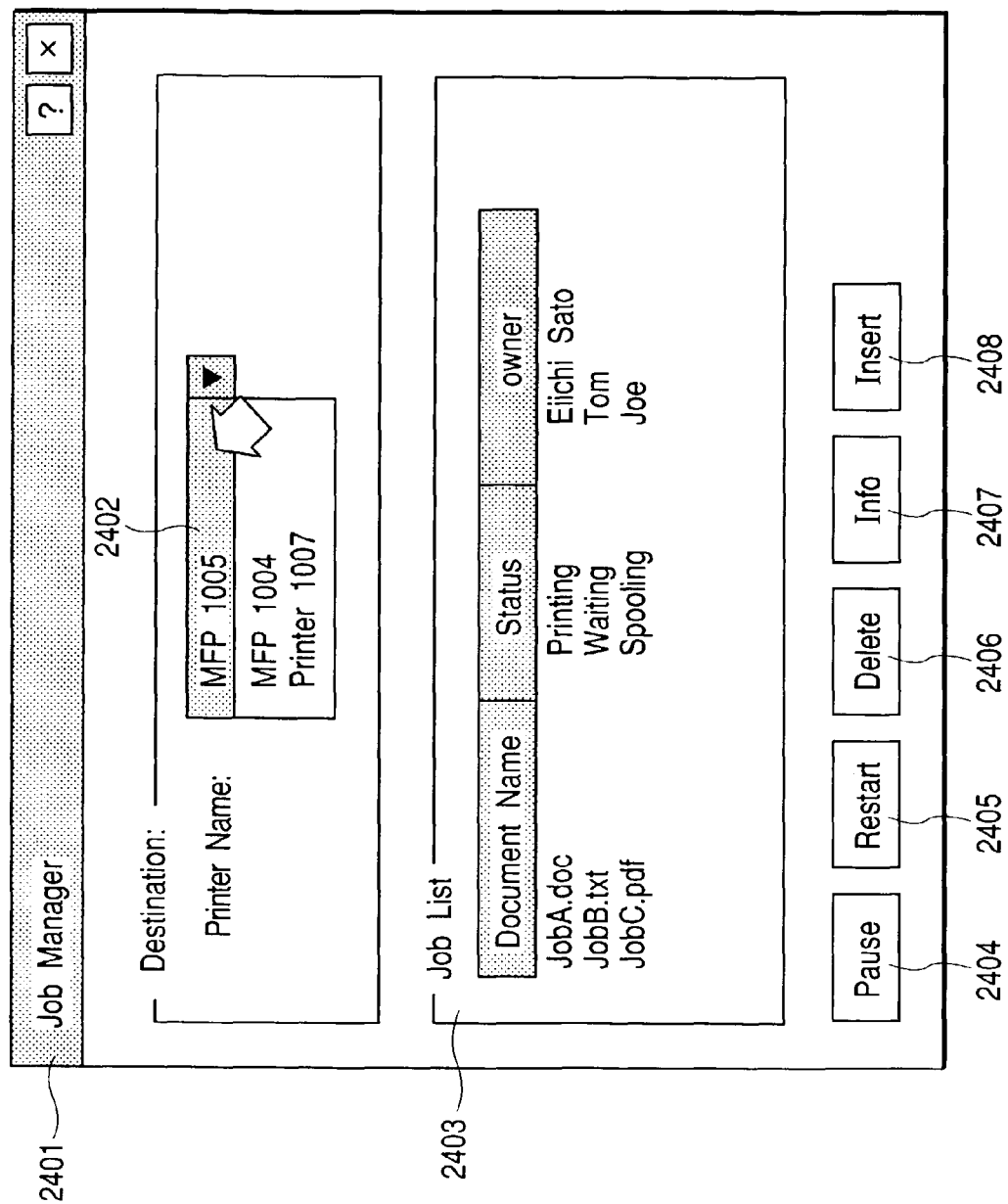
FIG. 22 is a diagram showing a user interface of a job manager.

The display and control of the print job is performed by executing a utility program for realizing the same on the client computer 1003. FIG. 22 shows a user interface of the utility program for realizing the same. Hereinafter, the present utility program will be called a job manager.

There will be described a process where the client computer 1003 displays and controls the print job in the device by the job manager using the drawing.

Here, reference numeral 2401 denotes a window of the job manager, and reference numeral 2402 denotes a selection column for selecting a device which is a target of the job management as a setting item thereof. The management target includes the print apparatus (image forming apparatus) such as the MFP 1004, 1005, or the printer 1007. Reference numeral 2403 denotes a column for displaying jobs in the print device in a list, where a document name, a status, an owner name, and the like of the job are displayed. Reference numeral 2404 denotes a suspension key, which has a function of suspending the print of the job selected by a pointing device or the like. Reference numeral 2405 denotes a restart key, which has a function of restarting the print of the job suspended by the suspension key 2404. Reference numeral 2406 denotes a delete key, which has a function of deleting the job selected by the pointing device or the like. Reference numeral 2407 denotes an information key, which has a function of displaying detailed information on the job selected by the pointing device or the like. Reference numeral 2408 denotes an insert key, which has a function of inserting the job selected by the pointing device or the like into a position selected by the pointing device or the like and changing the output order.

(Status Display of Device)

Figure 27:
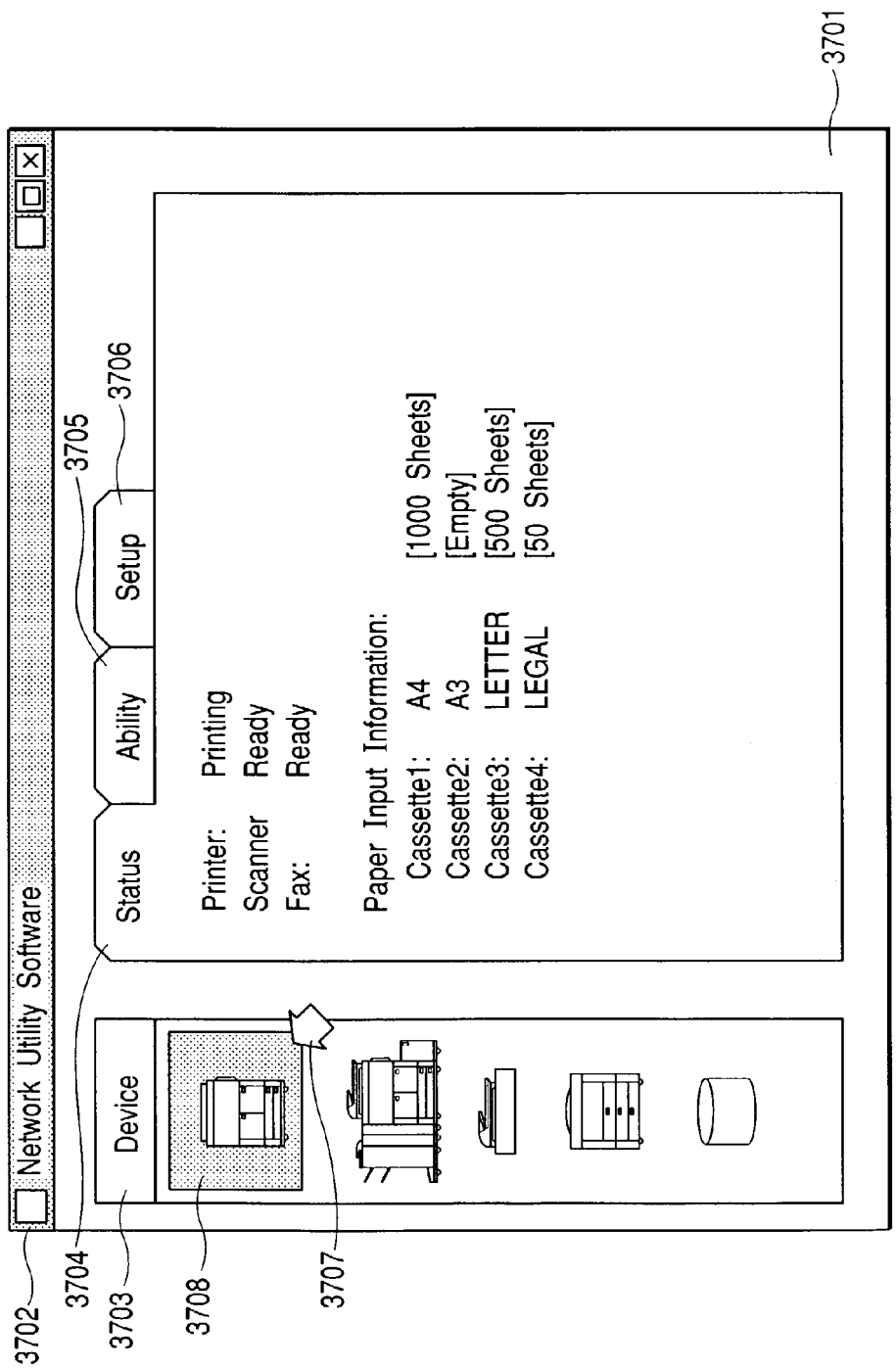
FIG. 27 is a diagram showing a user interface (status display screen) of a device manager.

The status display of the device is performed by executing a utility program for realizing the same on the client computer 1003. FIG. 27 shows a user interface of the utility program for realizing this. Hereinafter, the present utility program will be called a device manager.

The device manager described using the drawing is a software which operates on the client computer 1003 and directly communicates with a management target device such as the MFP 1004, 1005 through the SNMP communication so as to perform management of the device (status monitoring or function setting). Some device managers operate on the server computer 1002 and relay a request from the client computer 1003 via a HTML text or HTTP protocol in addition to the above device manager. With respect to the GUI of the utility software described here, a similar GUI can be easily created also on the server computer by using a well-known CGI or JAVA(R) applet technique so that the description thereof will not be particularly made.

In FIG. 27, reference numeral 3701 denotes a window and reference numeral 3702 denotes a title bar, which are used for displaying a hierarchy or title of the current window. Reference numeral 3703 denotes a device list window, where devices manageable by the present utility software connected on the network are displayed in a list. Reference numeral 3704 denotes a status tub, which is a window on which the status information of the device to be currently managed is displayed, through which the current use statuses of the printer, the scanner, and the facsimile, the number of cassette stages of the sheet feed unit, the size of sheet set in each sheet cassette, and the number of remaining sheets can be read. Further, reference numeral 3705 denotes a capability tub, which is a window on which capability information (for example, print speed or resolution) on the device to be currently managed (not shown) is displayed, and reference numeral 3706 denotes a setting tub, which is a window for setting a function configuration (for example, sheet feed cassette stage designation, network IP (Internet protocol)

address, and the like at the time of print) of the device to be currently managed, described later in detail. Reference numeral 3707 denotes a pointing device cursor by which the user can select the device for management from the device list window 3703 or switch the display such as the status tub, the capability tub, the setting tub, and the like described above. Reference numeral 3708 denotes a management target device being currently selected. In FIG. 27, it can be seen that the MFP 1004 without the option device or the like is selected.

(Configuration Change of Device)

Figure 5:
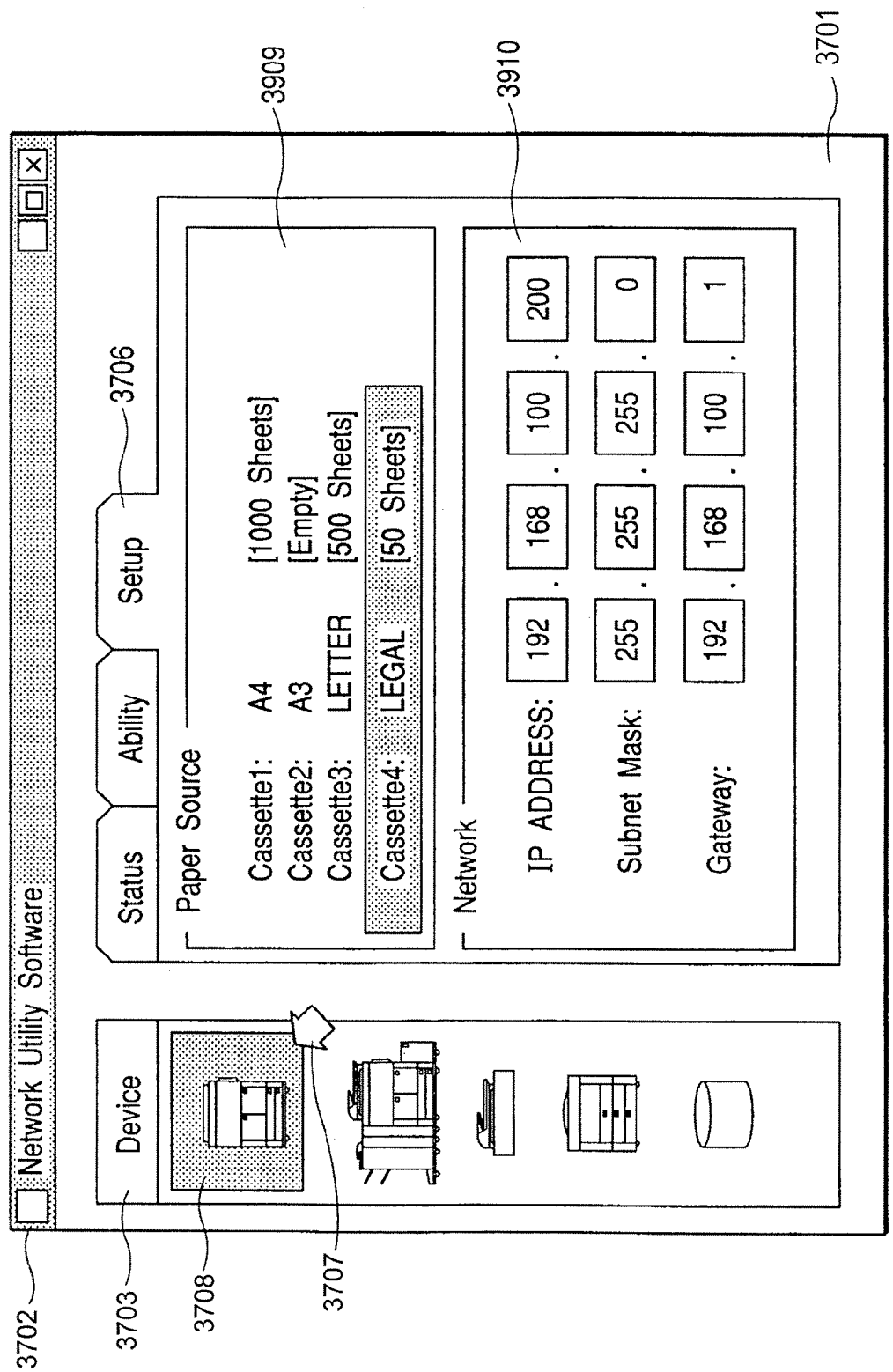
FIG. 5 is a diagram showing a user interface (setting screen) of a device manager.

The configuration change of the device is performed by executing a utility program for realizing this on the client computer 1003. FIG. 5 shows a user interface of the utility program for realizing this. This program is the device manger described above in FIG. 27. FIG. 5 shows a user interface displayed on the device manger when the setting tub 3706 is selected.

The device manager described using the drawing is a software which operates on the client computer 1003 and directly communicates with the management target device such as the MFP 1004, 1005 through the SNMP communication so as to perform management of the device (status monitoring or function setting). Some device managers operate on the server computer 1002 and relay a request from the client computer 1003 via a HTML text or HTTP protocol in addition to the above device manager. With respect to the GUI of the utility software described here, a similar GUI can be easily created also on the server computer by using a well-known CGI or JAVA(R) applet technique so that the description thereof will be not particularly made.

In FIG. 5, reference numeral 3701 denotes a window and reference numeral 3702 denotes a title bar, which are used for displaying a hierarchy or title of the current window. Reference numeral 3702 denotes a device list window, where the devices manageable by the present utility software connected on the network 1001 are displayed in a list. Reference numeral 3706 denotes a setting tub, which is a window for performing a function setting of the device to be currently managed. Further, reference numeral 3707 denotes a pointing device cursor, by which the user can switch the display of each tub or select a setting item.

Reference numeral 3909 denotes a column for setting a sheet supply source, a sheet to be supplied when printing is performed can be selected by selecting using the pointing device 3707 or the like. In the drawing, it can be seen that the Cassette 4 is selected. Reference numeral 3910 denotes a column for performing setting on the network, where various network parameters of the TCP/IP can be set.

Though not shown, it goes without saying that various settings on the device can be performed in addition to the above by using this device manager.

(Status Display and Control of Print Queue)

Figure 23:
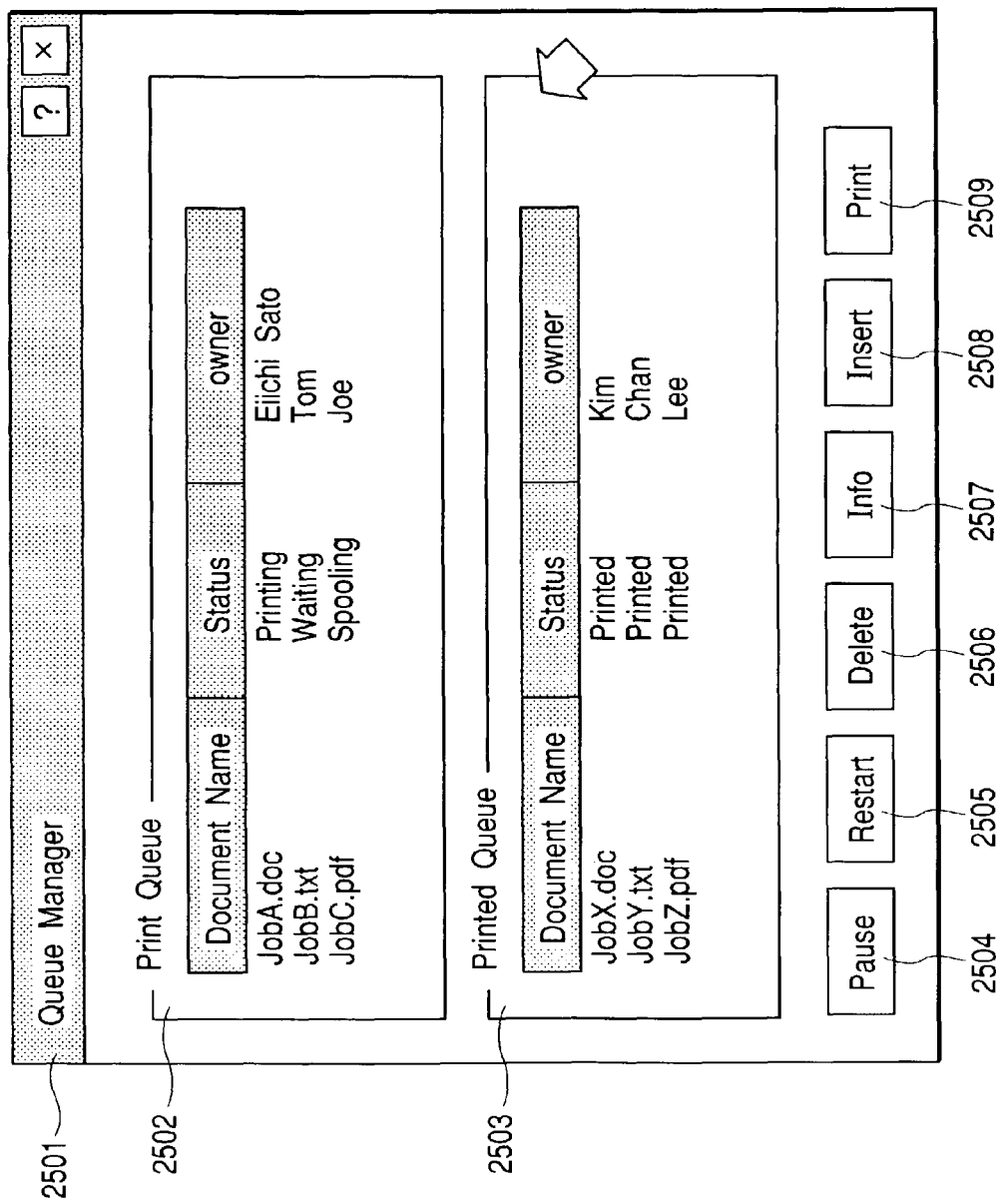
FIG. 23 is a diagram showing a user interface of a queue manager.

The status display and control of the print queue is performed by executing a utility program for realizing this on the client computer 1003. FIG. 23 shows a user interface of the utility program for realizing this. Hereinafter, the present utility program will be called a queue manager.

There will be described a process where the client computer 1003 displays and controls the print job in the device by the queue manager using the drawing. Here, reference numeral 2501 denotes a window of the job manager, and reference numeral 2502 denotes a column for displaying information on the job set in the print queue and reference numeral 2503 denotes a column for displaying information of the job set in the printed queue as the setting items therein. Information such as the document name, the status, the owner name, and the like of the job is displayed in each column. The printed queue is a queue for storing jobs which prints have already been performed, and which is configured to rapidly correspond to reprint by storing a constant quantity of jobs (or for a constant time).

Reference numeral 2504 denotes a suspension key, which has a function of suspending a print of the job selected by the pointing device or the like. Reference numeral 2505 denotes a restart key, which has a function of restarting a print of the job suspended by the suspension key 2504. Reference numeral 2506 denotes a delete key, which has a function of deleting the job selected by the pointing device or the like. Reference numeral 2507 denotes an information key, which has a function of displaying detailed information on the job selected by the pointing device or the like. Reference numeral 2508 denotes an insert key, which has a function of inserting the job selected by the pointing device or the like into a position selected by the pointing device and changing the output order. Reference numeral 2509 denotes a print key, which is used for reprinting the printed job stored in the printed queue.

(Configuration of MFP 1004, 1005)

Hereinafter, the configuration of the MFP 1004, 1005 will be described. The difference between the MFP 1004 and the MFP 1005 depends on whether or not the option device is connected thereto, so that only the MFP 1005 will be described if not particularly needed.

Figure 12:
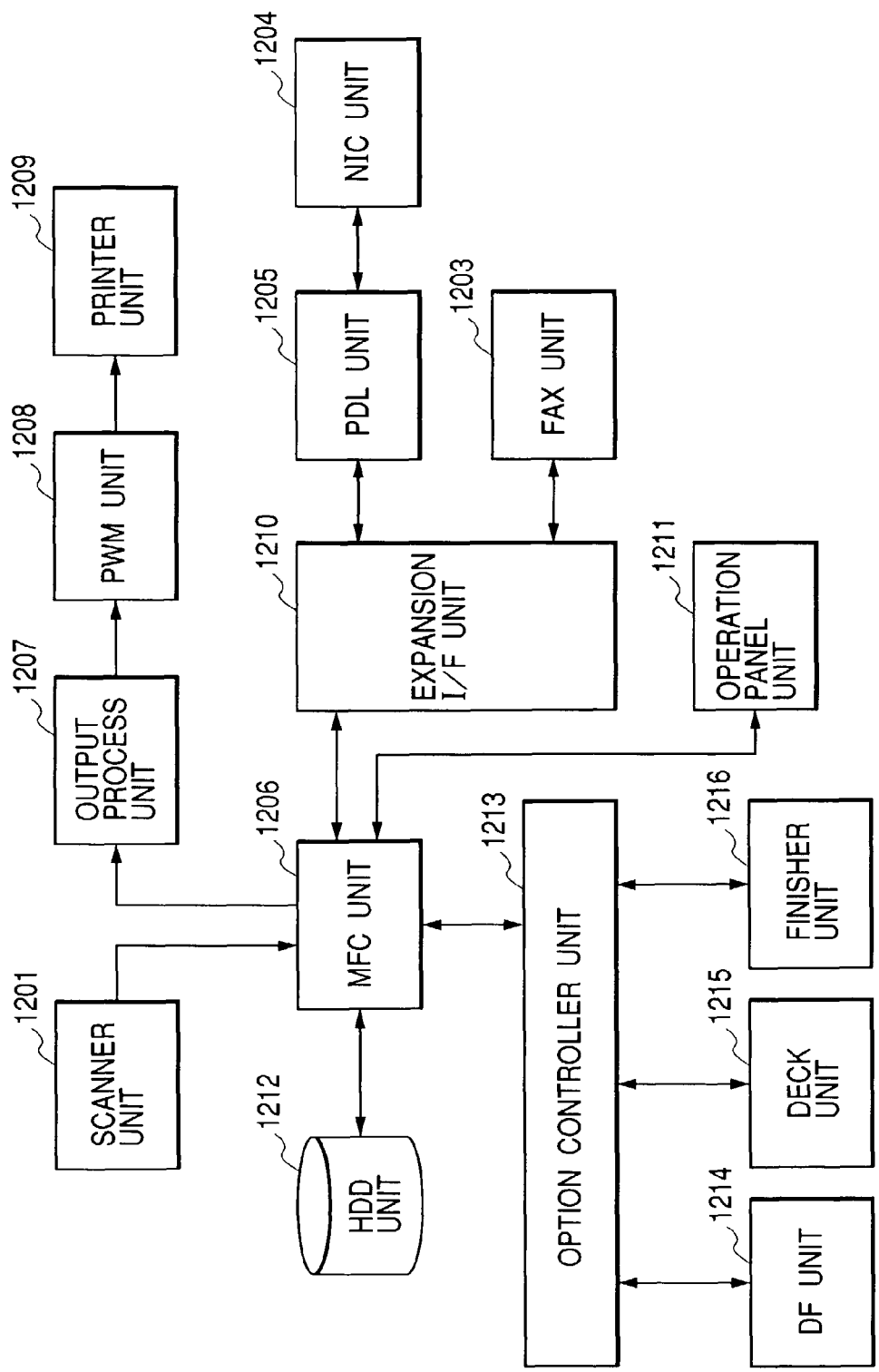
FIG. 12 is a schematic block diagram of MFP.

FIG. 12 is a schematic block diagram of the MFP 1005, where reference numeral 1201 denotes a scanner unit for reading an image, reference numeral 1203 denotes a FAX unit, as represented by a facsimile, for transmitting/receiving an image using a telephone line, reference numeral 1204 denotes a NIC (Network Interface Card) unit for exchanging image data or device information using the network, reference numeral 1205 denotes a PDL unit for expanding the page description language sent from the computer side into an image signal, reference numeral 1210 denotes an expansion I/F unit for connecting an expansion flock of the PDL unit 1205 or the FAX unit 1203 to the present device, reference numeral 1211 denotes an operation panel composed of an LCD or switch groups, reference numeral 1212 denotes a HDD unit which is a buffer area of the image data, reference numeral 1213 denotes an option controller unit for governing an interface of the present device and the option device, reference numeral 1207 denotes an output process unit for performing image process of the print data, reference numeral 1208 denotes a PWM unit for generating a laser print signal, reference numeral 1209 denotes a printer unit for performing print on a sheet, and reference numeral 1206 denotes a MFC (Multi Function Controller) unit for governing control of the entire device and control of the image data flow.

Further, reference numerals 1214, 1215, and 1216 denote an option device connected to the present device, reference numeral 1214 denotes a DF (document Feeder) unit capable of automatically feeding the document to be read in the scanner unit 1201 and sequentially sending to the scanner unit, reference numeral 1215 denotes a paper deck unit capable of stacking a large number of sheets at once and feeding the sheets, and reference numeral 1216 denotes a finisher unit for performing a finishing process for the printed sheet. Hereinafter, each block of the MFP 1005 described in FIG. 12 will be described in more detail.

(Configuration of Scanner Unit 1201)

Figure 13:
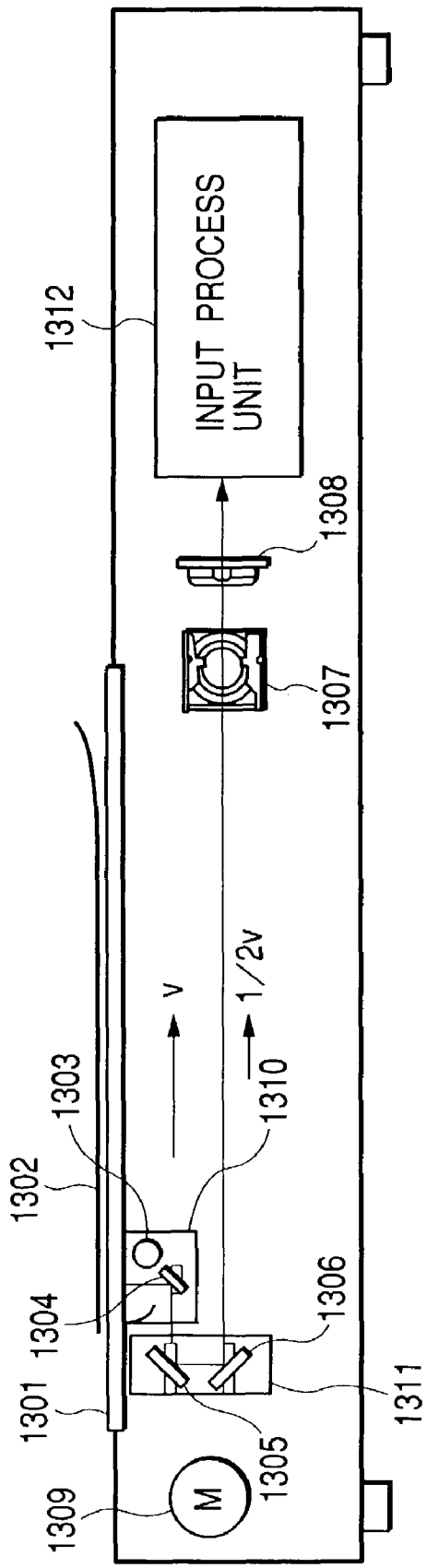
FIG. 13 is a diagram showing a scanner unit.

The configuration of the scanner unit 1201 will be described using FIG. 13.

At first, with respect to copying of an original in a copying machine, reference numeral 1301 denotes a platen glass on which an original 1302 to be read is placed. The original 1302 is illuminated by a light 1303 and is image-formed on a CCD 1308 by an optical system 1307 via mirrors 1304, 1305, and 1306. Further, a first mirror unit 1310 including the mirror 1304 and the light 1303 is mechanically driven at the speed of V by a motor 1309, and a second mirror unit 1311 including the mirrors 1305 and 1306 is driven at the speed of ½V so that the full page of the original 1302 is scanned. The image signal read in this manner is sent to an input process unit 1312 in the scanner unit 1201.

(Configuration of Input Process Unit 1312)

Figure 14:
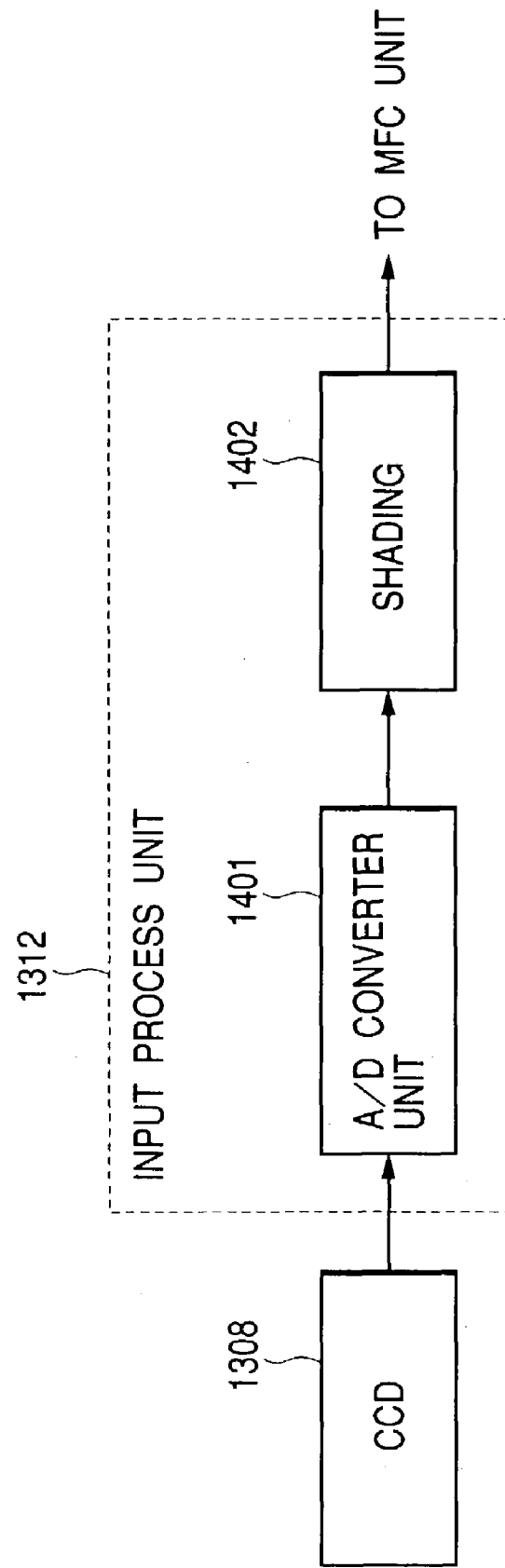
FIG. 14 is a diagram showing an input process unit.

The input process unit 1312 will be described using FIG. 14.

An input optical signal is converted into an electric signal by the CCD sensor 1308. The image signal read by this CCD sensor 1308 is input into an A/D converter unit 1401. The image signal is subjected to gain adjustment and offset adjustment, and then is converted to a digital image signal of 8 bits by the A/D converter. Thereafter, the digital signal is subjected to well-known shading correction using a read signal of a reference white plate in a shading correction 1402, and then is sent to the MFC unit 1206.

(Configuration of FAX Unit 1203)

Figure 15:
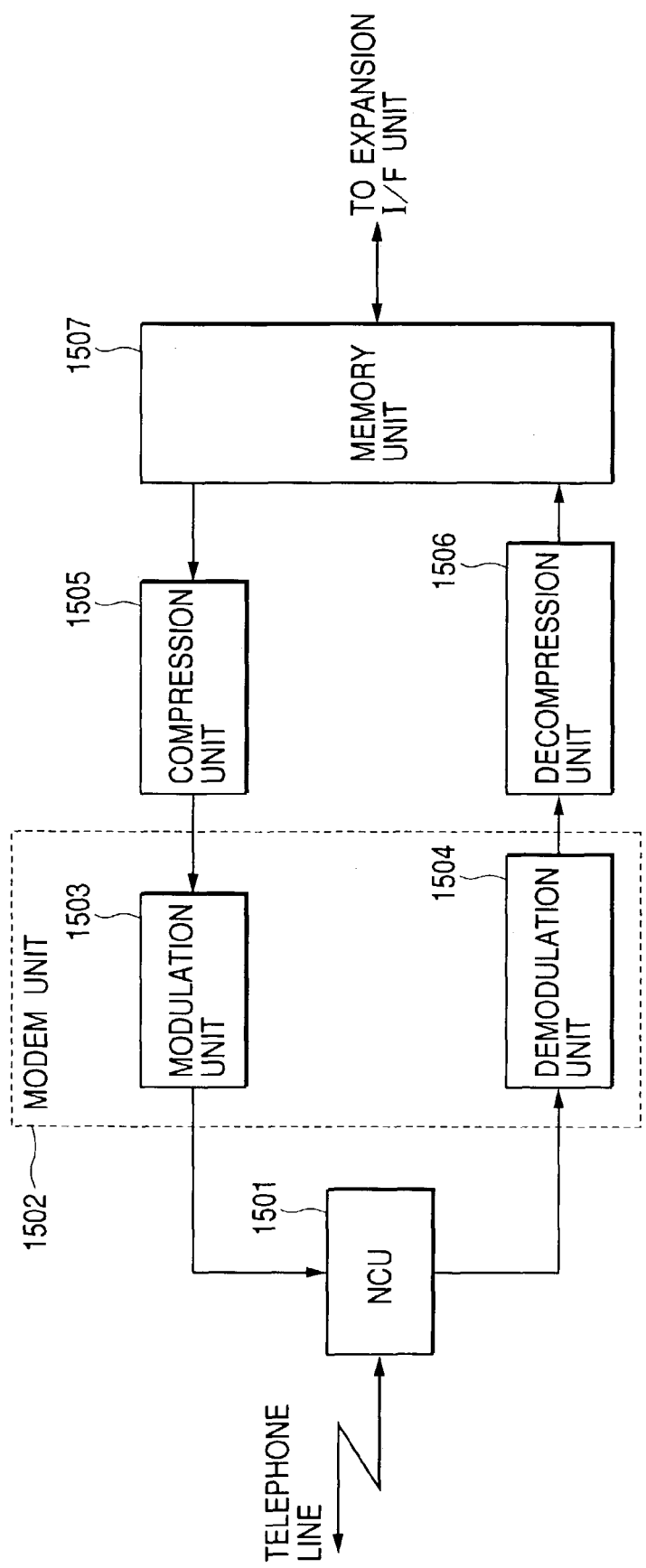
FIG. 15 is a diagram showing a FAX unit.

The FAX unit 1203 will be described using FIG. 15.

At first, in reception, data incoming through the telephone line is received and voltage-converted in a NCU unit 1501, and the data is subjected to A/D conversion and demodulation operation in a demodulation unit 1504 in a modem unit 1502, and then is expanded into raster data in a decompression unit 1506. The run-length method is generally used for compression/decompression in FAX, but the method is well known so that the description thereof will be omitted. The image converted into the raster data is temporarily stored in a memory unit 1507, and is sent via the expansion I/F unit 1210 to the MFC unit 1206 after it is confirmed that a sending error is not present in the image data.

Next, in transmission, the image signal of the raster image sent via the expansion I/F unit 1210 from the MFC unit 1206 is subjected to compression such as the run-length method in a compression unit 1505, and is subjected to D/A conversion and modulation operation in a modulation unit 1503 in the modem 1502, and is then sent via the NCU unit 1501 to the telephone line.

(Configuration of NIC Unit 1204)

The NIC unit 1204 will be described using FIG. 16.

This NIC unit 1204 has an interface function for the network 1001, which acquires information form the outside using an Ethernet (R) cable such as 10Base-T/100Base-TX or spreads information to the outside.

When the information is acquired from the outside, the information is voltage-converted in a trans unit 1601 to be sent to a LAN controller unit 1602. The LAN controller unit 1602 has a buffer memory 1 (not shown) therein, and determines whether or not the information is necessary to send the information to a buffer memory 2 (not shown), and then sends a signal to the PDL unit 1205.

Next, when the information is provided to the outside, the data sent from the PDL unit 1205 is added with the required information in the LAN controller unit 1602, and is connected to the network via the trans unit 1601.

(Configuration of PDL Unit 1205)

Next, the PDL unit 1205 will be described using FIG. 16.

The image data created by the application operating on the computer is configured with a document, a graphic, a photograph, and the like, each of which is configured with a combination of image description elements such as a character code, a graphic code, raster image data, and the like.

This is a so-called PDL (Page Description Language) and is represented by the PostScript (trademark) language by Adobe Systems.

Figure 16:
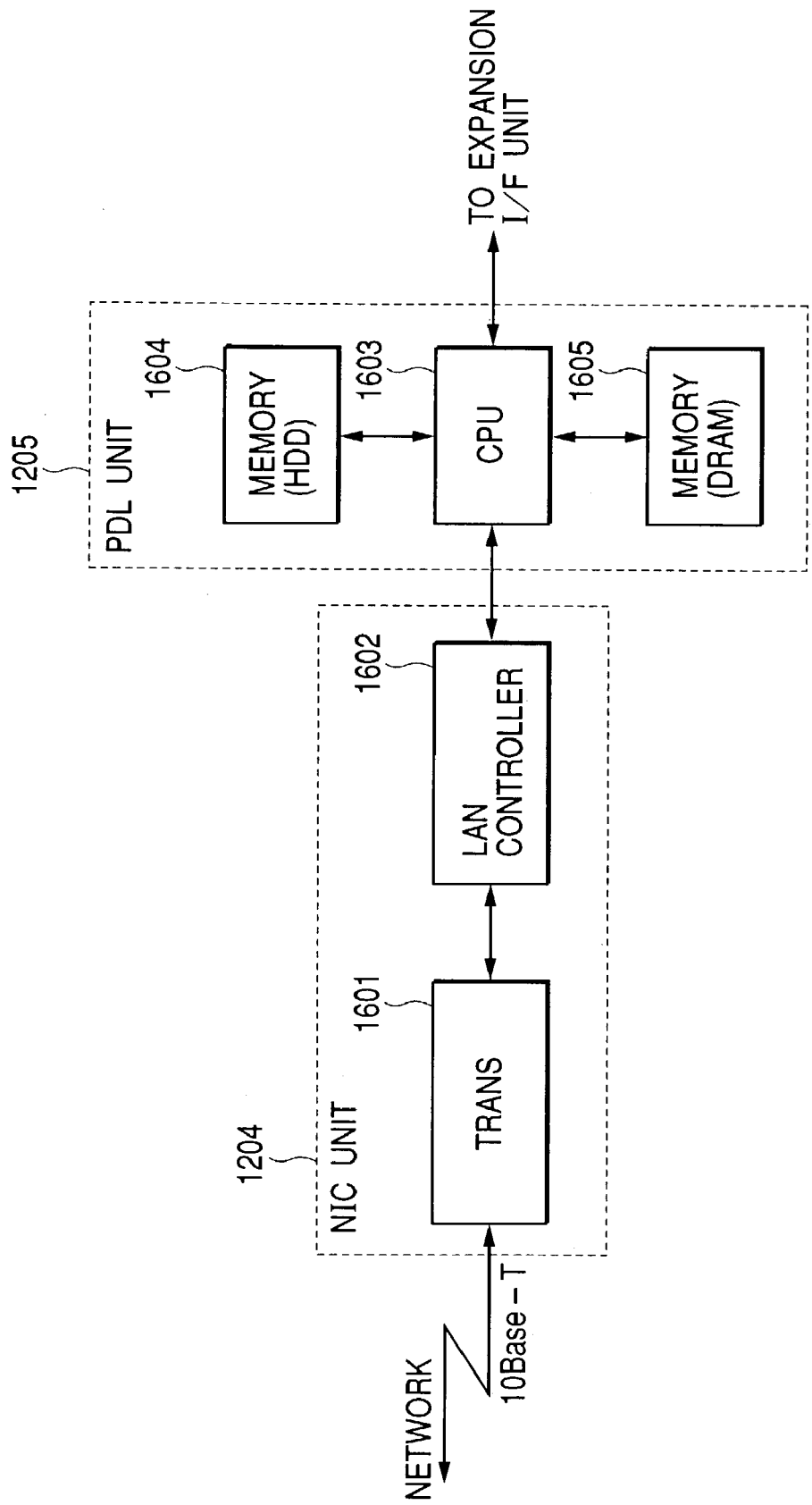
FIG. 16 is a diagram showing a NIC unit and a PDL unit.

FIG. 16 shows the portion showing a conversion process form the PDL data into the raster image data. The PDL data sent from the NIC unit 1204 is temporarily stored in a large-capacity memory 1604 such as a hard disk (HDD) via a CPU 1603 to be managed and saved for each job here.

Next, the CPU 1603 performs the raster image process called RIP (Raster Image Processing) to expand the PDL data into the raster image. The expanded raster image is stored in a fast-accessible memory 1605 such as DRAM for each job by page, and is sent from the expansion I/F unit 1210 to the MFC unit 1206 via the CPU 1603 again according to the status of the printer unit 1208.

(Configuration of MFP Unit 1206)

Figure 19:
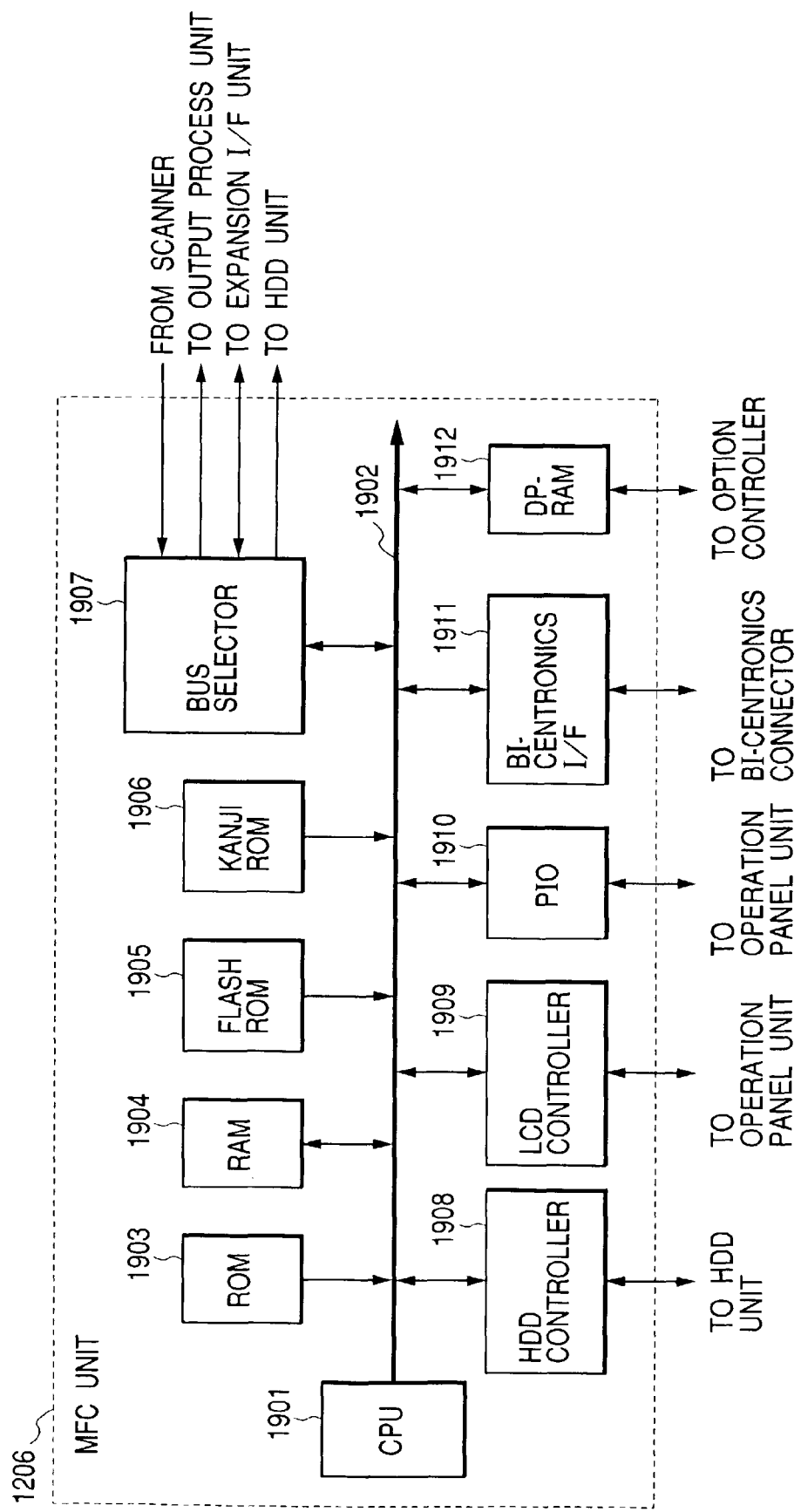
FIG. 19 is a diagram showing a MFC unit.

The MFC unit 1206 will be described using FIG. 19.

A bus selector unit 1907 of the MFC 1206 plays a role of so to say traffic control in the utilization of the MFP 1005. In other words, the direction where the image signal flows is controlled by bus switching according to various functions in the MFP 1005 such as a stand alone copying function, a network scan, a network print, a facsimile transmission/reception, and the like.

The following functions in the flow are considered in more detail.

Stand alone copying machine: scanner 1201→bus selector 1907→printer 1209

Network scan: scanner 1201→bus selector 1907 →NIC unit 1204

Network print: NIC unit 1204→bus selector 1907→printer 1209

Facsimile transmission function: scanner 1201→bus selector 1907→FAX unit 1203

Facsimile reception function: FAX unit 1203→bus selector 1907→printer 1209

The image data output from the bus selector 1907 may be sent to the HDD unit 1212 as needed to be saved in the HDD (Hard Disk Drive). In this case, through not shown, the image data can be compressed via the compression unit configured within the HDD 1212 to be saved in the HDD. The compression method used here may employ a general method such as JPEG, JBIG, ZIP, LZH, MH, MR, MMR, or the like. The compressed image data is managed for each job and is stored together with the added data such as the file name, the creator, the creation date/time, the file size, and the like.

Further, when a job number and a password are provided and stored together, a personal box function can be supported. This is a confidential function by which data can be temporarily saved or only a specific person can print out (read from the HDD).

When a job is designated and called for each stored job, after the password is authenticated, the job is called from the HDD and the compressed image is returned to the raster image by image decompression via the decompression unit (not shown), and is then sent to the printer unit 1209.

The MFC unit governs the entire control of the MFP 1005 other than the control of the signal flow of the image signal described above. In order to realize the process, the CPU 1901 reads and executes a program or data from a ROM 1903 and a FLASHROM 1905 via the CPU bus 1902 by one step. A RAM 1904 is used as a buffer area of data when, the program is executed. A KANJI ROM 1906 has a function of outputting a KANJI pattern when designating a code, thereby KANJI can be displayed on the LCD on the operation panel unit 1211. A HDD controller 1908 is directed for mediating the CPU 1901 and the HDD unit 1212, which controls to record the data designated by the CPU 1901 into the HDD unit 1212. A LCD controller 1909 displays a message or an image on the LCD in the operation panel unit 1212 or performs a process of sending an instruction from the user to the CPU 1901 through the touch panel. A PIO 1910 is connected to each switch group in the operation panel unit 1211 and is charge of sending the switch operation by the user to the CPU. A bi-centronics I/F 1911 is used to make bidirectional communication with a computer connected to the outside via a bi-centronics connector (not shown) and to fetch the program or the data into the MFP 1005. The program or data fetched in this manner is written into the FLASHROM 1905 in the MFC unit 1206 so that version upgrade or bug modification of the control program can be performed without exchanging a hard ROM. A DP-RAM 1912 is used for communicating with the option controller unit 1213 and is capable of reading/writing data from both the CPU 1901 and the option controller unit 1213.

(Configuration of Output Process Unit 1207)

Figure 17:
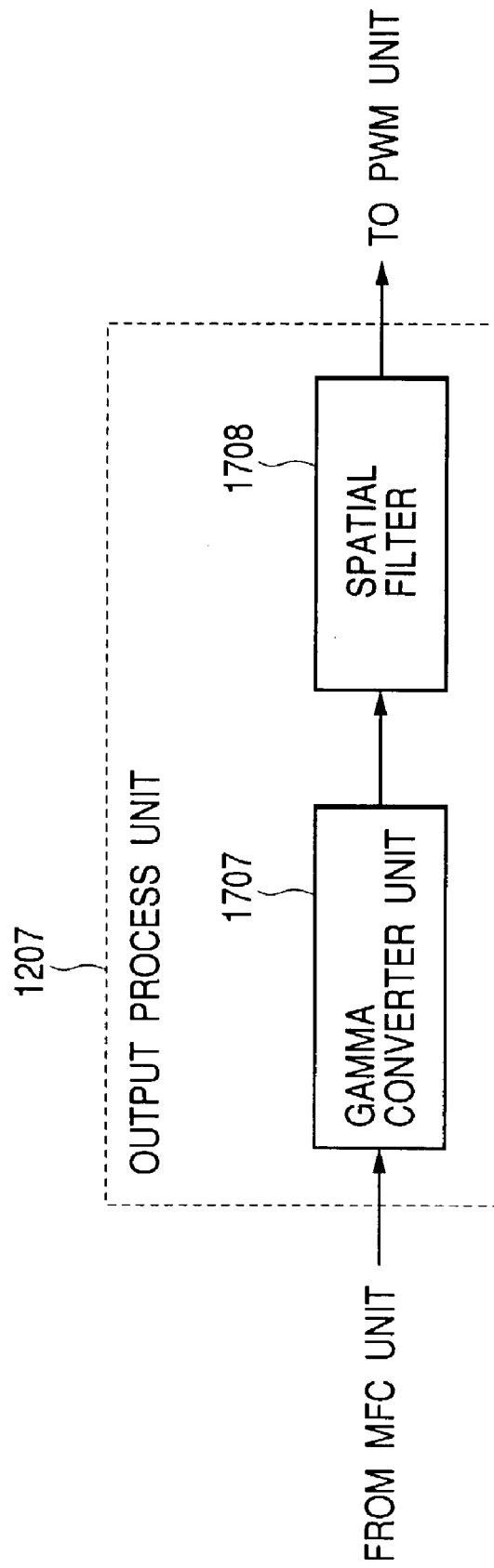
FIG. 17 is a diagram showing an output process unit.

The output process unit 1207 will described using FIG. 17.

After the image data sent from the MFC unit 1206 is converted into density data for the image output using a look up table (LUT) RAM in consideration of the characteristics of the toner and is subjected to sharpness or smoothing in a spatial filter 1708, the image signal is then sent to the PWM unit 1208

(Configuration of PWM Unit 1208)

Figure 18:
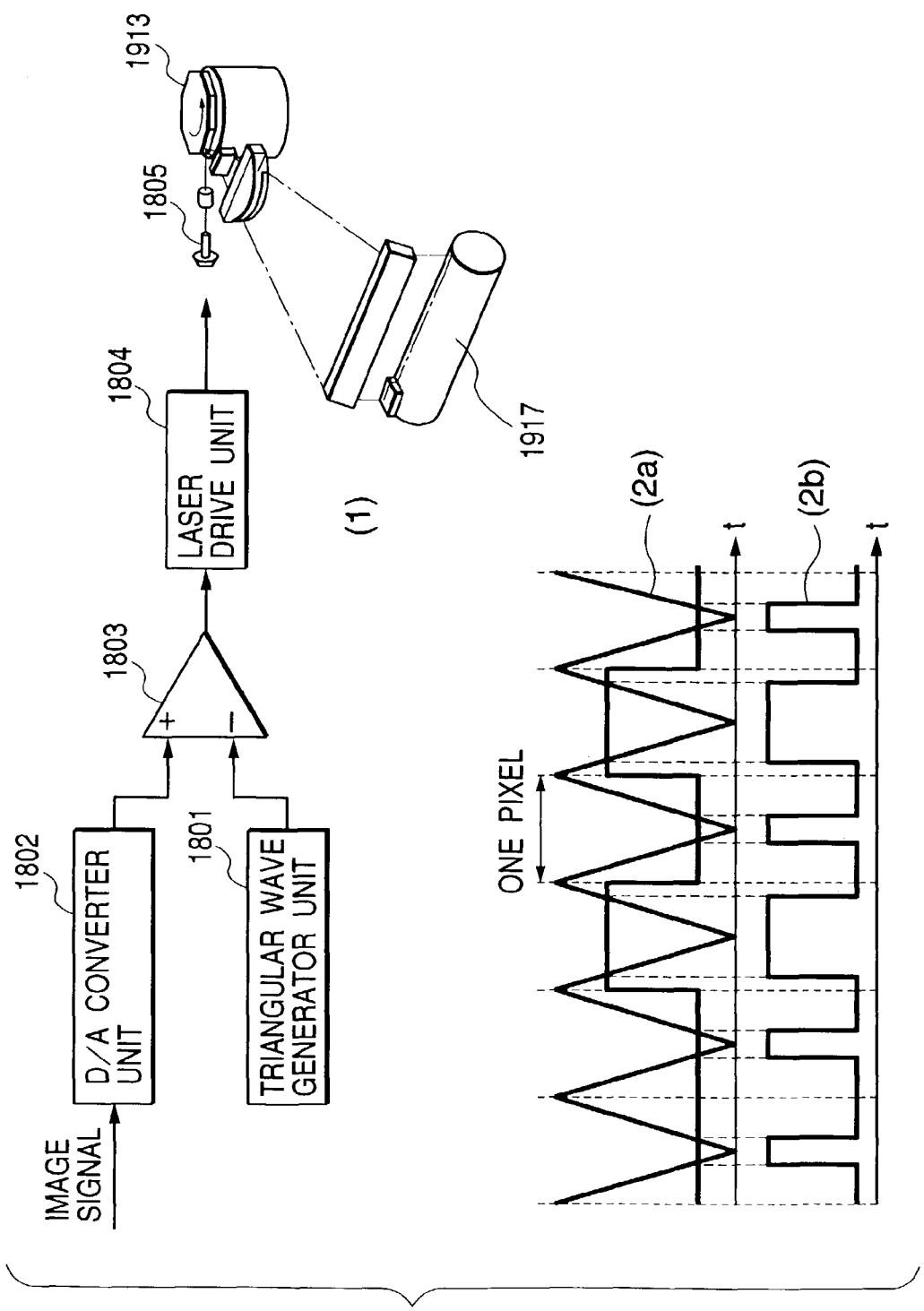
FIG. 18 is a diagram showing a PWM unit.

The PWM unit 1208 will be described using (1) of FIG. 18.

The image signal output from the output process unit 1207 is image-formed through the PWM unit 1208. In FIG. 18, reference numeral 1801 denotes a triangular wave generator unit. Reference numeral 1802 denotes a D/A converter where an input digital image signal is converted into an analog signal. The two signals are sent to a comparator 1803 as shown in (2a) of FIG. 18 to be compared in magnitude, and are sent to a laser drive unit 1804 as the signals shown in (2b) of FIG. 18 to be converted to laser beams in a laser 1805. The laser beam is scanned by a polygon scanner 1913 to be illuminated on a photosensitive drum 1917.

(Configuration of Printer Unit 1209 (in the Case of Monochrome MFP 1005))

Figure 11:
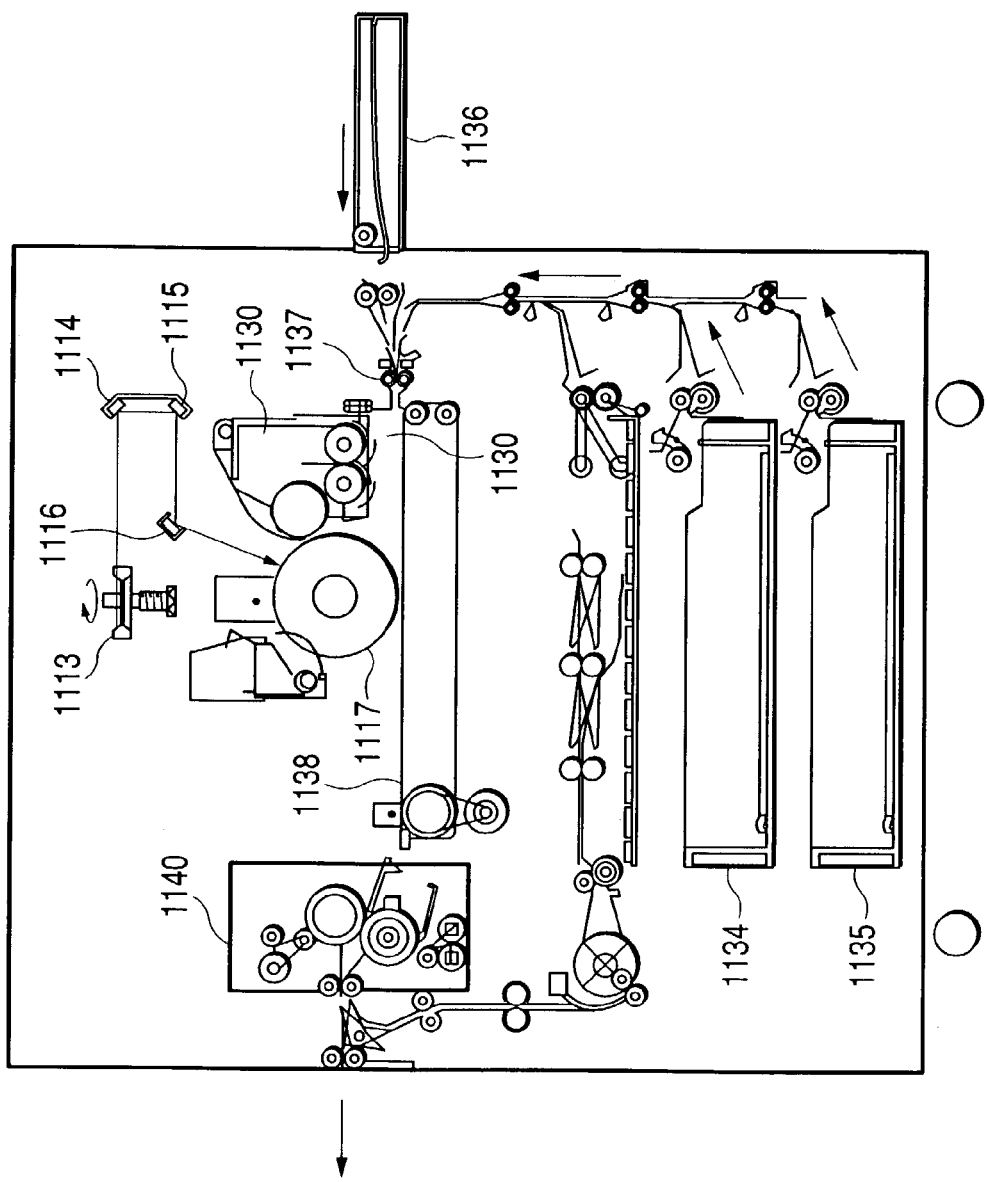
FIG. 11 is an appearance view of a printer.

FIG. 11 is an appearance view of a monochrome printer unit.

Reference numeral 1113 denotes a polygon mirror, which receives a laser light emitted from a semiconductor laser 1805. The laser light scans a photosensitive drum 1117 via mirrors 1114, 1115, and 1116. On the other hand, reference numeral 1130 denotes a developer for supplying a black color toner, where a toner image is formed on the photosensitive drum 1117 according to the laser light and the toner image is transferred on a sheet so that an output image can be obtained.

A sheet fed from either a sheet cassette 1134, 1135 or a manual tray 1136 is adsorbed on a transfer belt 1138 via a resist roller 1137 to be carried. A timing of feeding sheets is synchronized and a toner is previously developed on the photosensitive drum 1117. The toner is transferred on the sheet along with sheet carrying. The sheet on which the toner is transferred is separated and the toner is fixed on the sheet by a fixer 1140 to be discharged.

(Configuration of Finisher Unit 1216)

Figure 20:
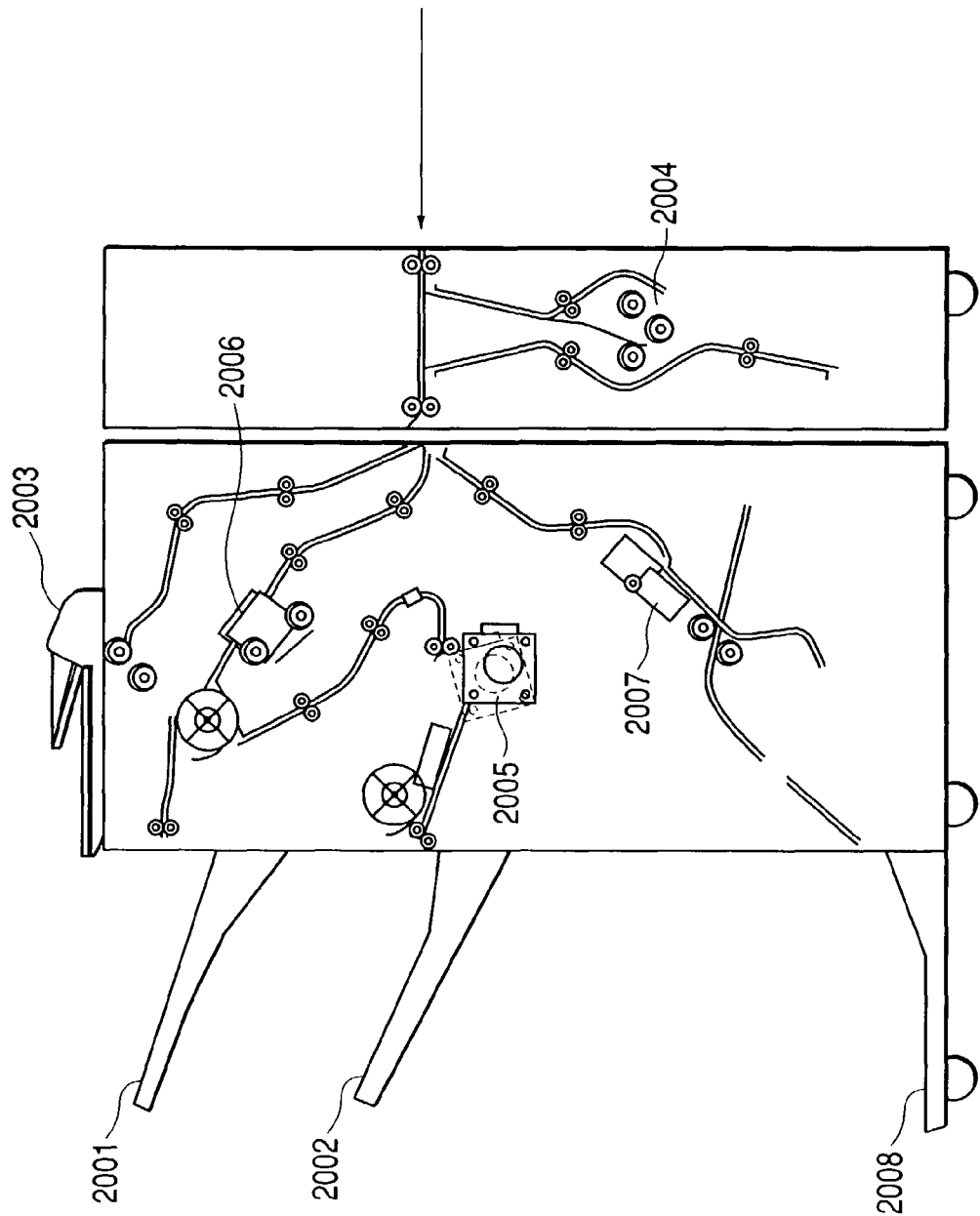
FIG. 20 is an appearance view of a finisher unit.

FIG. 20 is an appearance view of the finisher unit.

The sheet discharged from the fixer unit 1040 in the printer unit 1209 enters the finisher unit 1216. The finisher unit 1216 includes a sample tray 2001 and a stack tray 2002, which are switched according to the job type or the number of discharged sheets and from which the sheet is discharged. A sort method has three types of a bin sort method where a plurality of bins are provided and sheets are classified into each bin, an electronic sort function described later, and a shift sort method for shifting a bin (or a tray) in the depth direction and classifying output sheets for each job.

The electronic sort function is called collat. When the electronic sort function has a large-capacity memory such as the above HDD unit 1212 and this memory is used as a buffer memory, it is possible to support an electronic sorting function using a so-called collate function of changing the order of buffered pages and the discharging order.

Next, a group function is a function of classifying for each page, on the contrary, the sorting is a function of classifying for each job. Further, when the sheets are discharged to the stack tray 2002, the sheets before discharged are stored for each job and can be bound in a stapler 2005 immediately before discharged.

In addition, a Z folder 2004 for folding a sheet in a Z shape and a puncher 2006 for punching two (or three) holes for filing are provided down to the above two trays, which perform processes according to the job types, respectively. Further, an inserter 2003 is used for performing an inserting function, where a sheet to be inserted can be inserted.

A saddle stitcher 2007 is used for folding the sheet in half in a booklet form and binding the fold line thereof. In this case, the sheet is discharged to a book tray 2008.

Additionally, though not shown, it is possible to add a gluing bind for bookbinding or a cutting for lining up the end faces of the bind face and the opposite face after binding.

(Circuit Block of Finisher Unit)

Figure 21:
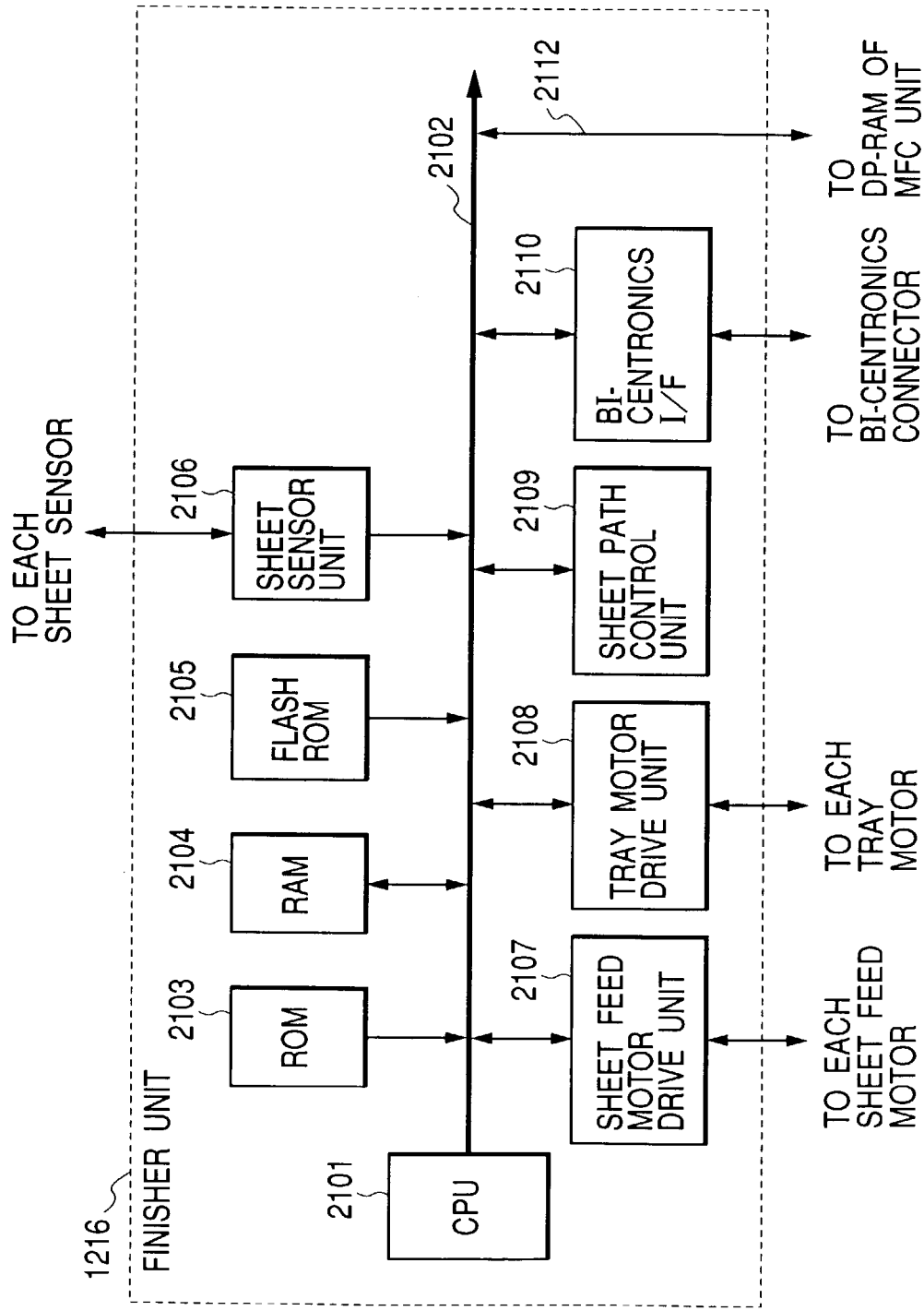
FIG. 21 is a circuit block diagram of the finisher unit.

FIG. 21 is a circuit block diagram of the finisher unit 1216.

In the drawing, reference numeral 2101 denotes a CPU for governing the entire control of the finisher unit, which reads and executes a program or data from a ROM 2103 and a FLASHROM 2105 via a CPU bus 2102 by one step. A RAM 2104 is used as a buffer area of data when the program is executed. A bi-centronics I/F 2110 is used for making bidirectional communication with a computer connected to the outside via a bi-centronics connector (not shown) and fetching a program or data in the finisher unit 1216. The program or data fetched in this manner is written into the FLASHROM 2105 in the finisher 1216 so that version upgrade or bug modification of the control program can be performed without exchanging a hard ROM. The CPU bus 2102 is connected to the option controller unit 1213 in the MFP 1005 via the CPU bus 2102 or a bus 2112, and further connected to the DP-RAM 1912 provided in the MFC unit 1206. The CPU 1901 of the MFP 1005 and the CPU 2101 of the finisher unit 1216 exchange information using the DP-RAM 1912. Reference numeral 2106 denotes a sheet sensor unit, which is connected to each sheet sensor provided in the finisher unit 1216 and is used for monitoring whether or not the sheets correctly pass through the finisher unit 1216 and confirming whether or not the discharged sheets remain on the sheet discharge tray. Reference numeral 2107 denotes a sheet feed motor drive unit, which is directly connected to each motor mechanically connected to a sheet feed roller to send a sheet feed request from the CPU to the motor and to drive the sheet feed roller or the like. Reference numeral 2108 denotes a tray motor drive unit, which moves up and down each tray motor and controls to discharge sheets to an arbitrary sheet discharge tray. Reference numeral 2109 denotes a sheet path control unit, which controls the flow of sheets so that the sheets passing through the finisher 1216 are sent to a required unit according to the requested job.

(Network 1001)

Next, the network 1001 will be described.

Figure 24:
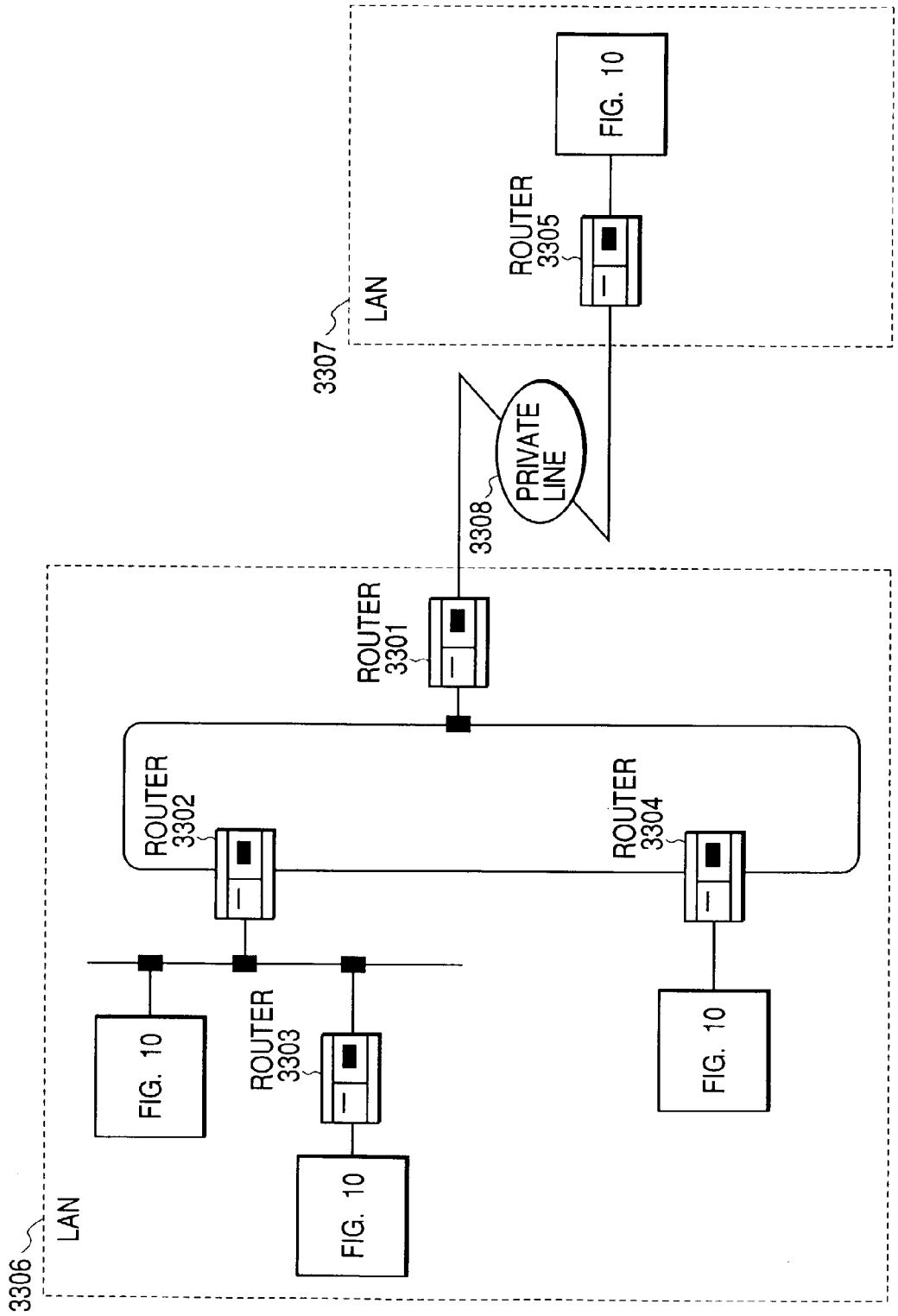
FIG. 24 is an explanatory diagram of a network.

As shown in FIG. 24, in the network 1001, the configurations as shown in FIG. 10 are interconnected through devices for interconnecting networks called router to construct additional networks called LAN (Local Area Network).

A LAN 3306 is connected to a router 3305 in another LAN 3307 via the internal router 3301 through a private line 3308, and these networks are formed in a multiple manner to construct a vast connection form called WAN (Wide Area Network).

(Data)

Figure 25:
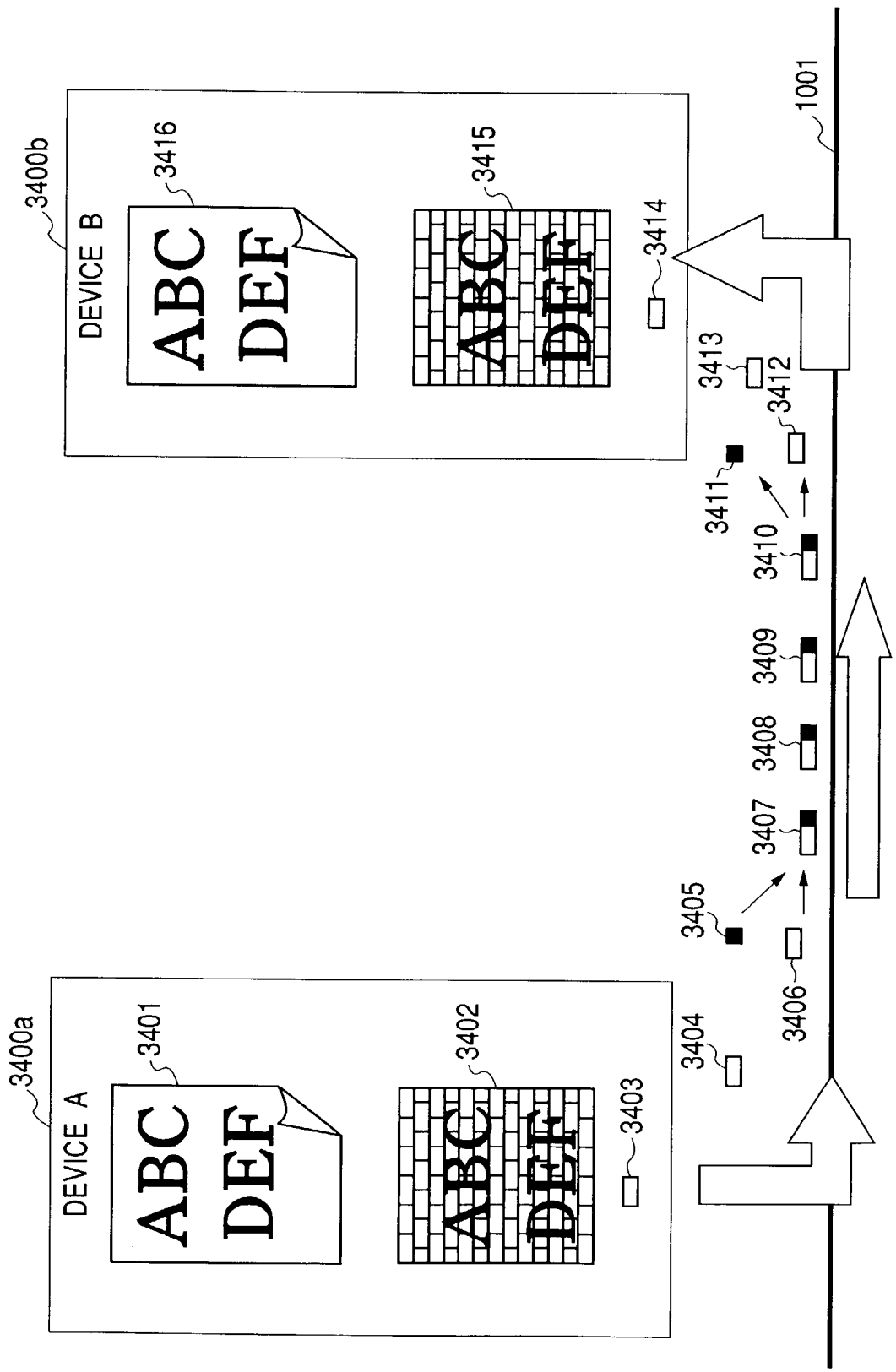
FIG. 25 is a diagram showing an image of data through the network.

Next, data passing therethrough will be described in FIG. 25.

Data 3401 is present in a source device A (3400*a*), and the data may be image data, PLD data, or a program. When this data is sent to a destination device B (3400*b*) via the network 1001, the data 3401 is segmentalized and divided like the data 3402. When a destination address called a header 3405 (destination IP address when the TCP/IP protocol is used) is added to the divided data 3403, 3404, 3406, or the like, which is assumed to be a packet 3407 to be sequentially sent on the network 1001. When an address of the device B and a header 3411 of the packet 3410 matches with each other, the data 3412 is separated to be reproduced in the data state in the device A.

(Packet Configuration)

In order to describe the packet 3407 in more detail, the data packet passing through the Ethernet (R) which is one media constructing the LAN will be described using FIG. 6.

Figure 6:
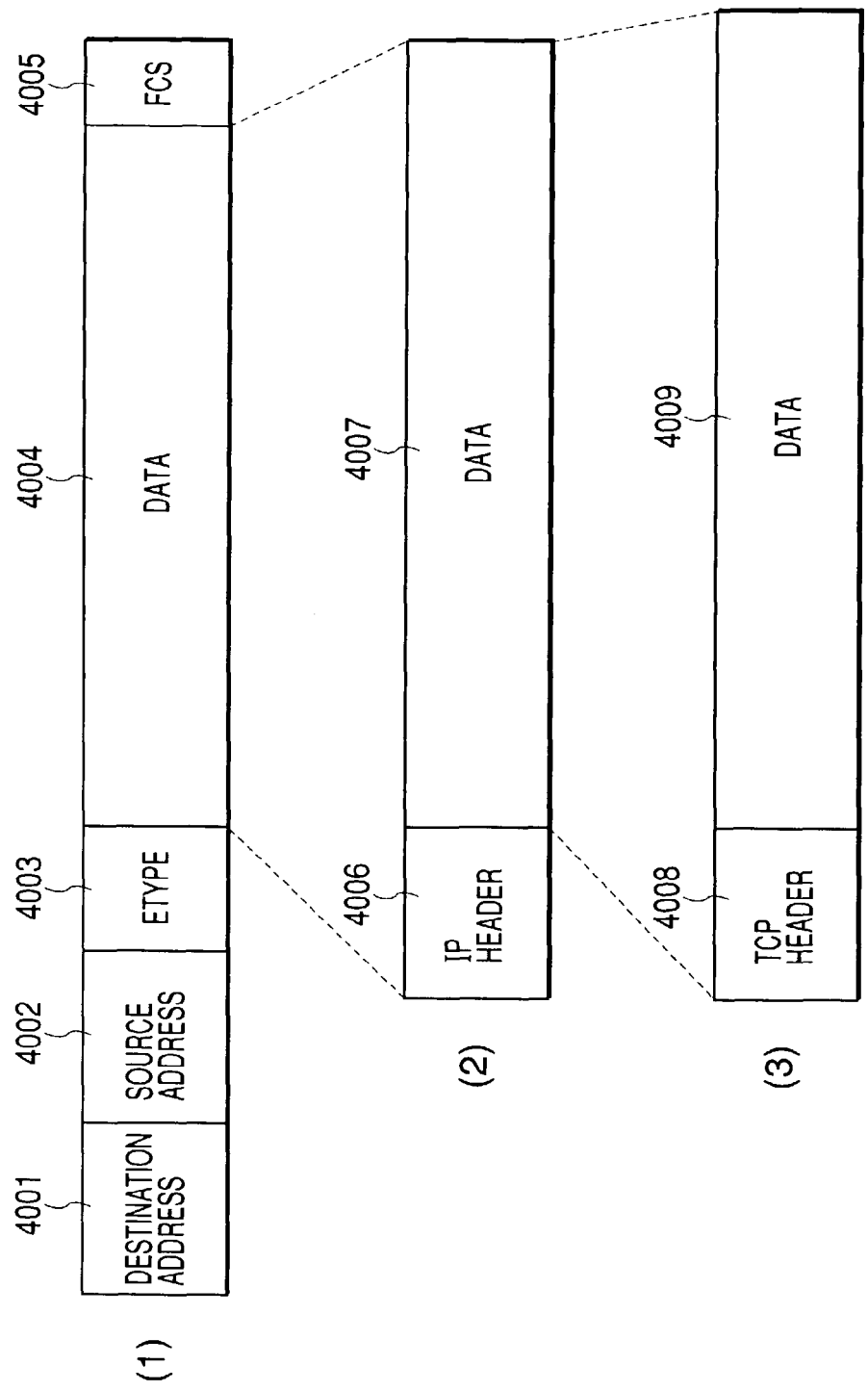
FIG. 6 is a diagram showing a data packet.

(1) of FIG. 6 shows an Ethernet (R) frame format, which is a maximum unit of the data packet passing through the Ethernet (R). In the drawing, reference numeral 4001 denotes a destination hardware address where the packet is desired to reach, and reference numeral 4002 denotes a source hardware address. A MAC address generally held by the network card is set between the both. Reference numeral 4003 denotes a ETYPE field, which is used for indicating which data the subsequent data is. When the subsequent data is IP, 0800 in hexadecimal reference numeral is set in this field. Reference numeral 4004 denotes a data portion, in which data to be sent to the destination hardware address 4001 is set. Reference numeral 4005 denotes a check field called FCS, which is used for confirming at the reception side whether or not this packet has normally reached.

(2) of FIG. 6 is a conceptual diagram of an IP data packet. This data packet is roughly divided into an IP header portion 4006 and a data portion 4007, which are included in the data portion 4004 of the Ethernet frame format. That one data packet is included in the data portion of an upper packet is called encapsulation.

(3) of FIG. 6 is a conceptual diagram of the TCP data packet. The data packet is roughly divided into a TCP header portion 4008 and a data portion 4009, which are encapsulated in the data portion 4007 of the IP data packet.

The configuration of the data packet passing through the Ethernet (R) using the TCP/IP protocol has the packet configuration described here.

(IP Packet)

Figure 7:
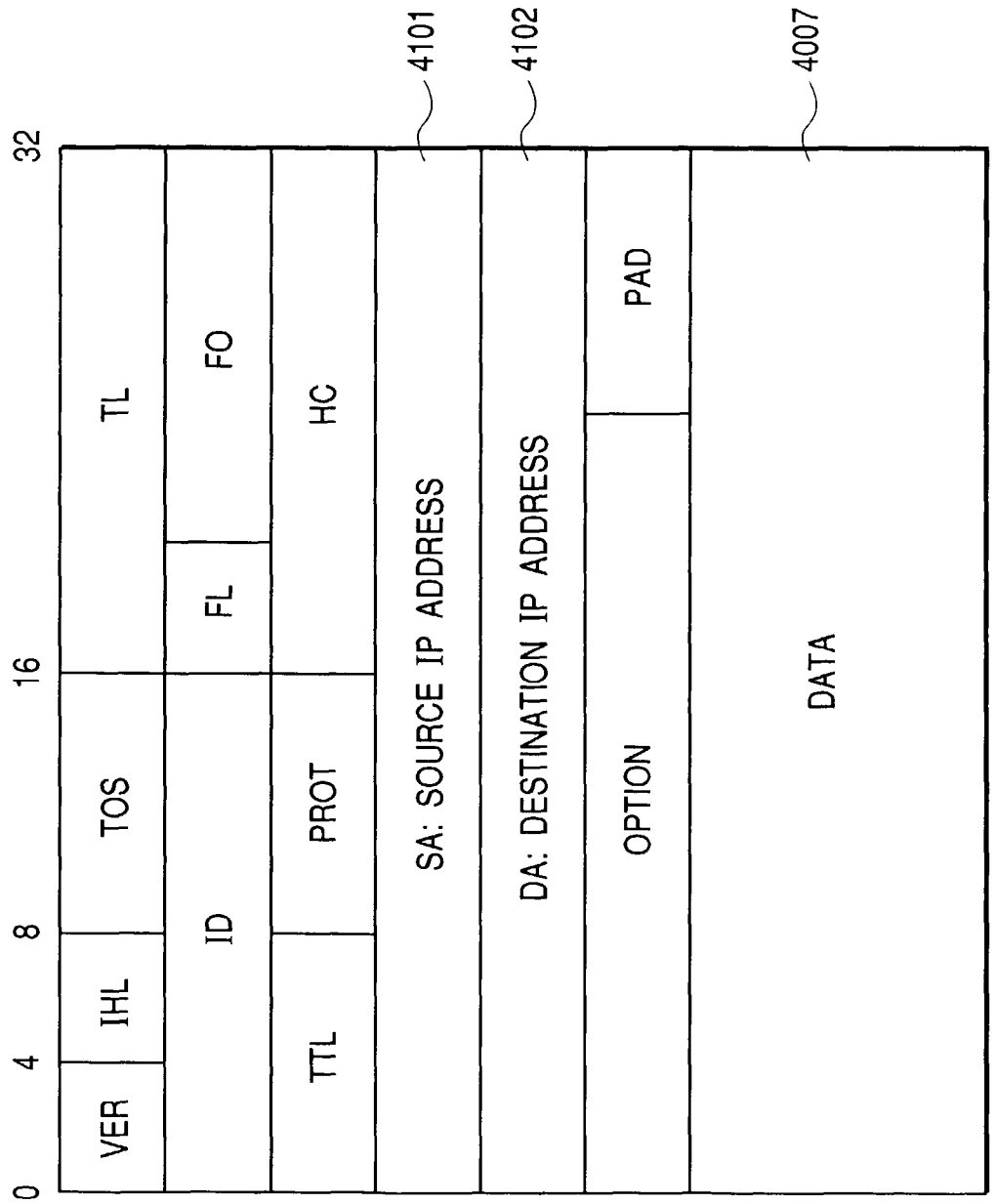
FIG. 7 is a block diagram of an IP packet.

FIG. 7 shows a configuration of the IP packet, where reference numeral 4101 denotes a field for setting a source IP address, reference numeral 4102 denotes a field for setting a destination IP address, and reference numeral 4007 denotes the above data filed of the IP packet. In the drawing, all the portions except the data portion 4007 are called IP header, where various information is additionally included, but the description thereof will be omitted.

(TCP Packet)

Figure 8:
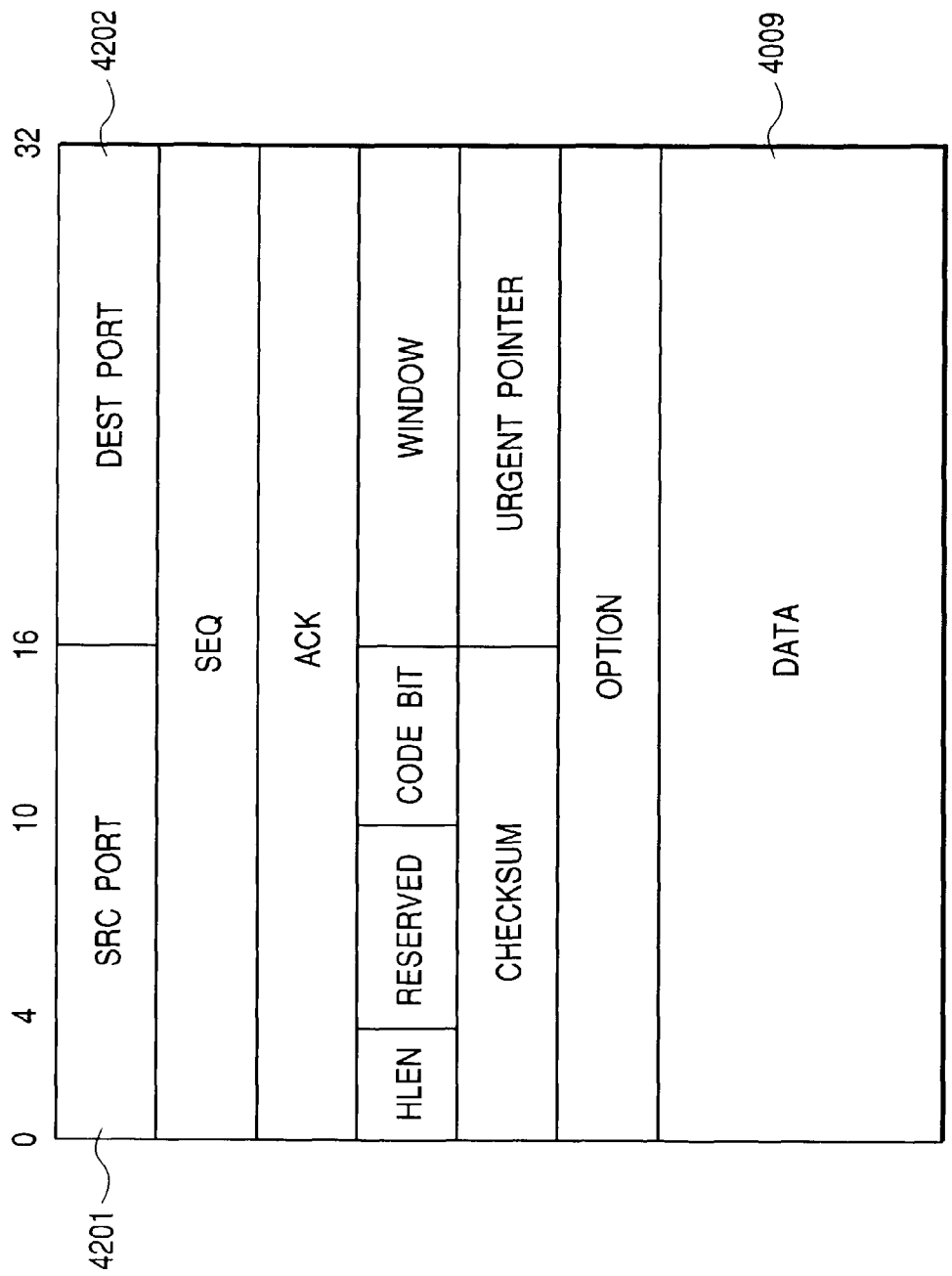
FIG. 8 is a block diagram of a TCP packet.

FIG. 8 shows a configuration of the TCP packet, where reference numeral 4201 denotes a field for setting a source port number, reference numeral 4202 denotes a field for setting a destination port number, and reference numeral 4009 denotes the above data field of the TCP packet. The port number is a value for specifying an application to be utilized (or to be utilized at the reception side), for example, it is prescribed that a port 21 is used when the FTP is used.

In the drawing, all the portions except the data portion 4009 are called TCP header, where various information is additionally included, but the description thereof will be omitted. Further, various data for updating using the TCP/IP protocol is set in the data portion 4009.

(LPS (Line Print Service))

Next, LPS (Line Print Service) using the TCP/IP protocol will be described.

The LPS is a print service realized by the LPD (Line Print Demon) executed at a server side and the LPR (Lightweight Presentation Protocol) executed at a client side. The LPD is executed in the MFP 1005, which is ready for receiving a print request from the client.

The client 1003 executes the LPR command to sent a file or the like to the MFP 1005 so as to perform printing. Since a port number for the LPD is 515, the number 515 is set in the field 4202 for setting the destination port number. Further, since the LPR client has to use the source port number within a range from 721 to 731, an available port number is selected therefrom and is set in the field 4201 for setting the source port number.

A command associated with the LPR is set in the data portion 4009 of the TCP packet. The above process is performed at the client 1003 side so that the command is sent to the LAN 1001 as the TCP/IP packet and reaches the MFP 1005 as the reception side.

(Reception Process of MFP 1005)

Figures 1, 2:
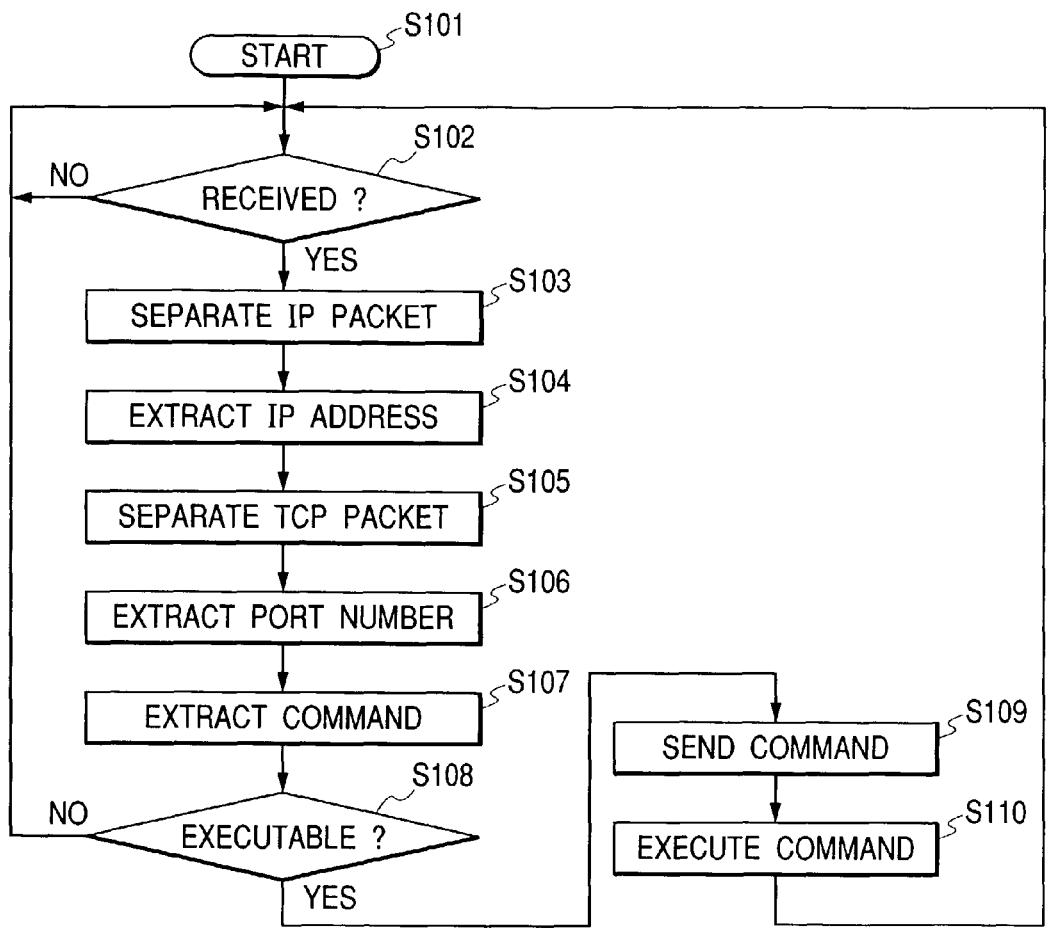
FIG. 1 is a flow chart showing a device access control procedure according to a first embodiment.
FIG. 2 is a diagram showing a table for decision means used in the first embodiment.

Next, there will be described how the TCP/IP packet which reaches the MFP 1005 is processed in the MFP 1005 using the flow chart in FIG. 1. FIG. 1 is a diagram best showing the characteristics of the present invention. This process is performed by the CPU 1901 in the MFC unit 1206 within the MFP 1005.

The received data is sent to the MFC unit 1206 via the NIC unit 1204, the PDL unit 1205, and the expansion I/F unit 1210. The data is read by the CPU 1901 via the CPU bus 1902 through the control of the bus selector 1907 in the MFC unit 1206.

The CPU 1901 executes the process according to the program code stored in the ROM 1903. When the program is activated at first (S101), the CPU 1901 checks whether or not a command has been received (S102). When the command for the present device is received, the IP packet portion is separated from the data portion 4004 of the received Ethernet (R) frame (S103), and the source IP address 4104 is extracted from the IP header portion (S104). Subsequently, the CPU 1901 separates the TCP packet portion form the data portion 4007 of the IP packet (S105), and further extracts the destination port number 4202 from the TCP header portion, and extracts the command from the data portion 4009 of the TCP packet (S107). When the destination port number is, for example, 515, it is found that the packet is a packet (command) for the LPD. When the data portion 4009 is further read, it is possible to determine which command the client 1003 issues to the LPD of the MFP 1005.

Figure 9:
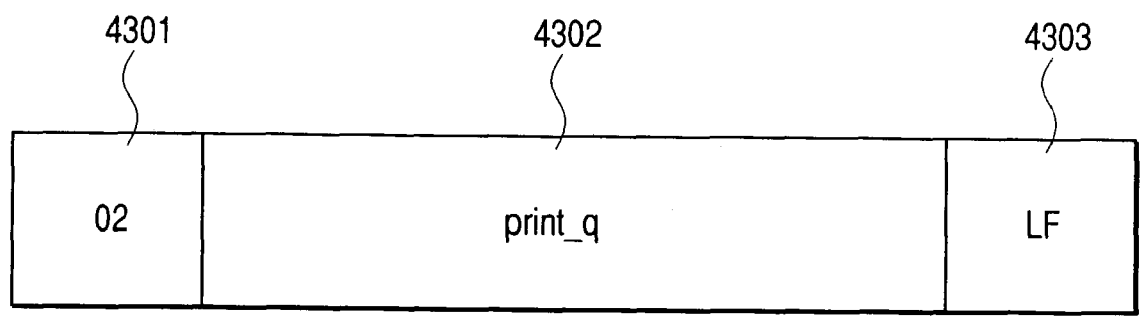
FIG. 9 is a diagram showing one example of a command (instruction) for LPD.

FIG. 9 shows one example of the command for the LPD.

The first reference numeral "02"4301 is a command "receive printer job", and the subsequent character sting "print_q"4302 designates a queue of the device where the LPD is executed. The final "LF" 4303 is a line field character, and this code indicates the ending.

The CPU 1901 which acquires the IP address of the client 1003 which requests the command through the above process and the command requested from the client 1003 determines whether or not this client 1003 can execute the command according to the information of the table stored in the FLASHROM 1905 (S108).

FIG. 2 is a table stored in the FLASHROM 1905. According to the present embodiment, three IP addresses are registered in the table, which shows whether or not the clients respectively having the addresses can execute the respective commands of "LPR", "configuration change", and "reprint". The "LPR" in the table is the above print command, the "configuration change" is a command for changing the configuration of the MFP 1005, and the "reprint" is a command for reprinting the printed job. Further, "1" in the table indicates the executable command, and "0" indicates the nonexecutable command. Though not shown, more IP addresses can be registered in this table, and the commands can be increased as far as the storage area is available. Means for creating this table may employ a method of manually creating by a network manager or the like, a method for uniquely determining by the IP address range, or the like.

The CPU 1901 determines whether or not the client 1003 which sends the command can execute the command on the information in the table stored in the FLASHROM 1905 (S108). When the command is executable, the command portion (example in FIG. 9) is sent to the LPD (S109) and the command requested by the LPD is executed (S110). In the case of the example in FIG. 9, the LPD receives the printer job to be sequentially sent. When all the processes are terminated, the control proceeds to the command standby status (S102) again.

When it is determined that the command is not executable, the requested command is ignored, and the control proceeds to the command standby status (S102) again. Some requests cannot be ignored depending on the command type. Therefore, though not illustrated, it goes without saying that, after command reject process or interruption process required for the respective commands is performed, the control proceeds to the command standby status (S102) again.

Second Embodiment

Whereas, according to the first embodiment, whether or not the command execution is possible is determined by the IP address of the client 1003 which requests the command, according to the present embodiment, there will be described a method for determining whether or not the command execution is possible by user ID information. In this description, all the drawings except FIGS. 1 and 2 are common to the first embodiment so that the description thereof will be omitted in the present embodiment.

Various print applications operable on the client 1003 are executable in addition to the LPR described in the first embodiment. For example, one example thereof is the SMB which is a representative print protocol used in Windows (R) by Microsoft Corporation. Though not illustrated, the SMB data packet is encapsulated by the NetBIOS, and the NetBIOS is encapsulated by the UDP packet. The UDP packet is not described, but it is in equivalent relationship with the TCP packet. The TCP packet improves the data reliability as a connection type, on the contrary, the UDP packet is a protocol emphasizing easiness or high-speed rather than the data reliability as a connectionless type.

When the print is performed using the SMB, the packet includes a file name, a user name (user ID) information, and the like in addition to the print data. According to the present embodiment, the user ID portion is extracted from such a packet to determine whether or not the command requested for each user is executable.

The process of the CPU 1901 will be described in more detail using the flow chart in FIG. 3. The received data is sent to the MFC unit 1206 via the NIC unit 1204, the PDL unit 1205, and the expansion I/F unit 1210. The data is read by the CPU 1901 via the CPU bus 1902 through the control of the bus selector 1907 in the MFC unit 1206.

The CPU 1901 executes the process by the program code stored in the ROM 1903. When the program is activated at first (S301), the CPU 1901 checks whether or not a command has been received (S302). When the command for the present device is received, the IP packet portion is separated from the data portion 4004 of the received Ethernet (R) frame (S303). Subsequently the CPU 1901 separates the UDP packet portion from the data portion 4007 of the IP packet (S304), and further extracts the destination port number 4202 from the UDP header portion (S305), and extracts the command from the data portion 4009 of the UDP packet. This port number is later used for specifying the application for sending the received packet. Subsequently the CPU 1901 separates the NetBIOS packet from the data portion 4009 of the UDP packet (S306), and further separates the SMB packet from the NetBIOS packet (S307). The CPU 1901 extracts the user ID portion from the SMB packet (S308), and determines whether or not the user can execute the SMB print based on this information (S309). At that time, the CPU 1901 determines whether or not the user can execute the SMB print based on the information in the table stored in the FLASHROM 1905 (S309).

Figures 3, 4:
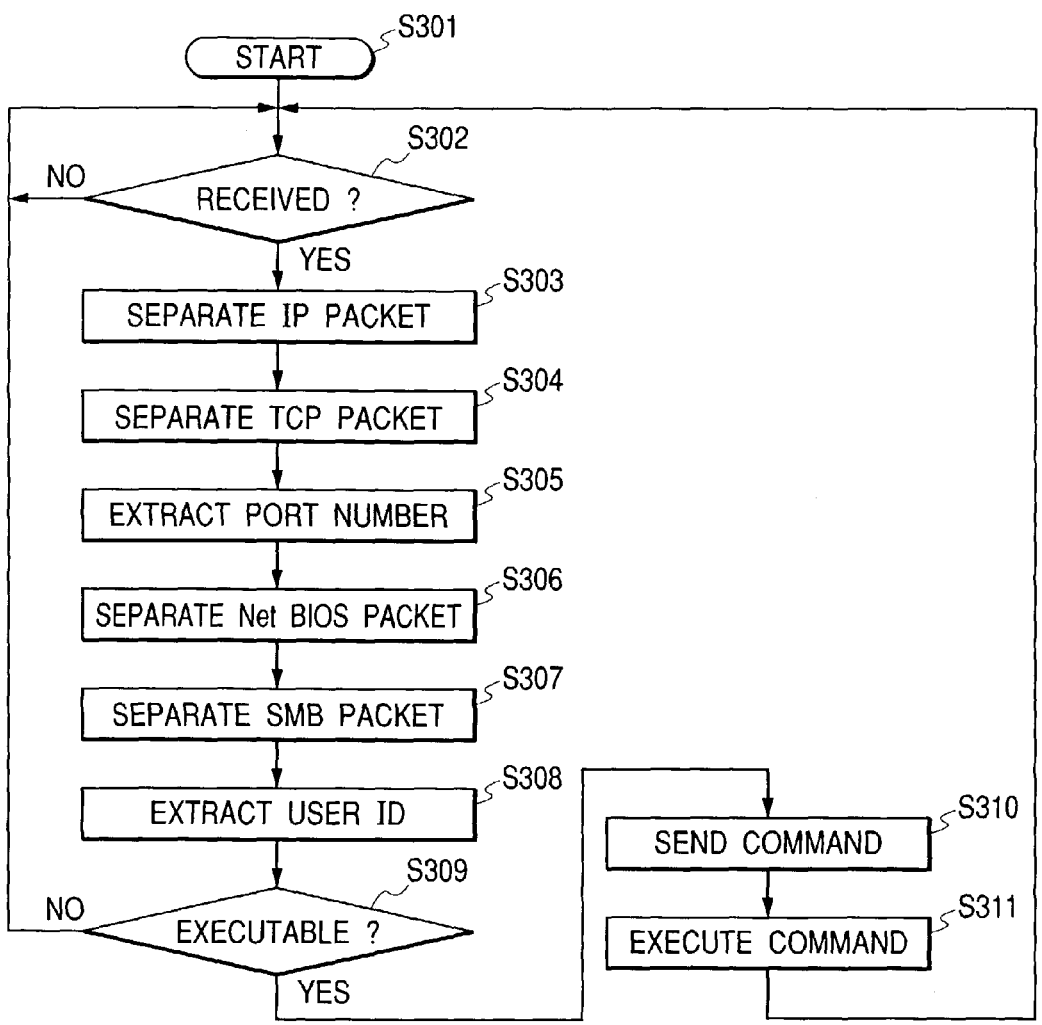
FIG. 3 is a flow chart showing a device access control procedure according to a second embodiment.
FIG. 4 is a diagram showing a table for decision means used in the second embodiment.

FIG. 4 shows a table stored in the FLASHROM 1905. According to the present embodiment, three user ID are registered in the table, which shows whether or not the clients respectively having the user ID can execute the respective commands of "SMB print", "configuration change", and "reprint". The "SMB print" in the table is the above print command using the SMB protocol, the "configuration change" is a command for changing the configuration of the MFP 1005, and the "reprint" is a command for reprinting the printed job. Only the SMB print is described according to the present embodiment, but it goes without saying that other protocol is encapsulated in the data field 4009 of the TCP or UDP packet and the command is defined by the protocol so that the command including the user ID can be packet-communicated. Further, "1" in the table indicates the executable command, and "0" indicates the nonexecutable command. Though not illustrated, more user ID can be registered in this table, and the commands can be increased as far as the storage area is available. Means for creating this table may employ a method of manually creating by a network manager or the like, a method for uniquely determining by the IP address range, or the like.

The CPU 1901 determines whether or not the user which sends the command can execute the command based on the information of the table stored in the FLASHROM 1905 (S309). When it is determined that the user can execute the command, the command portion is sent to the application corresponding to the extracted port number (S310), and the process is executed by the application which receives this (for example, SMB print application) (S311). In the case of the present embodiment, the process of printing the SMB printer job to be subsequently sent is performed. When all the processes are terminated, the control proceeds to the command standby status (S302) again.

When it is determined that the user cannot execute the command, the requested command is ignored and the control proceeds to the command standby status (S302) again. Some requests cannot be ignored depending on the command type. Therefore, though not illustrated, it goes without saying that, after command reject process or interruption process required for the respective commands is performed, the control proceeds to the command standby status (S302) again.

Since the above embodiments are only specific examples for implementing the present invention, the technical scope of the present invention does not have to be interpreted in a limited manner. In other words, the present invention can be variously implemented without departing from the technical sprit thereof or the main characteristic thereof.

As described above, according to the present invention, an image forming apparatus which receives a command extracts a command requested from the received data and client information (IP address or user ID) and confirms whether or not the client which sends the command can execute the received command. When the client can execute the command, the process according to the command is performed. When the user cannot execute the command, the command is not performed.

Thereby, it is possible to prevent a failure due to that the user without knowledge unintentionally changes the configuration of the device or a leakage of confidential information (print of confidential document remaining on the print queue) which can occur when an outsider temporarily uses the network.

What is claimed is:

1. An image forming apparatus comprising:
   a receiver for receiving a data packet from a client via a network;
   a first extraction unit constructed to extract an Internet protocol address of the client from the received data packet;
   a management unit constructed to manage a plurality of command information corresponding to the Internet protocol address that is among a plurality of Internet protocol addresses, wherein the plurality of command information includes information about whether or not to execute commands, including a command for configuring the image forming apparatus and a command for reprinting a printed job;
   a second extraction unit constructed to extract command information for the image forming apparatus from the received data packet;
   a decision unit constructed to decide whether or not to execute a command designated by the extracted command information which is sent by the client, wherein the decision is based on all of the following: the extracted Internet protocol address, the managed information for the commands, and the extracted command information; and
   a control unit constructed to control execution of the command designated by the extracted command information which is sent by the client according to the decision taken by the decision unit.

2. A control method of an image forming apparatus comprising:
   receiving a data packet from a client via a network;
   extracting an Internet protocol address of the client from the received data packet;
   managing a plurality of command information corresponding to the Internet protocol address that is among a plurality of Internet protocol addresses, wherein the plurality of command information includes information about whether or not to execute commands, including a command for configuring the image forming apparatus and a command for reprinting a printed job;
   extracting command information for the image forming apparatus from the received data packet;
   deciding whether or not to execute a command designated by the extracted command information which is sent by the client, wherein deciding is based on all of the following: the extracted Internet protocol address, the managed information for the commands, and the extracted command information; and
   controlling execution of the command according to the decision, wherein the command is designated by the extracted command information sent by the client.

* * * * *